US012198171B2

(12) United States Patent
Srinivasan et al.

(10) Patent No.: US 12,198,171 B2
(45) Date of Patent: Jan. 14, 2025

(54) APPARATUSES, COMPUTER-IMPLEMENTED METHODS, AND COMPUTER PROGRAM PRODUCTS FOR IMPROVED USER ACCOUNT IDENTIFICATION FOR SHARED ACCOUNT LINKING

(71) Applicant: Bytedance Inc., Wilmington, DE (US)

(72) Inventors: Thothathri Srinivasan, Mountain View, CA (US); Sunil Arora, Sunnyvale, CA (US); Bhupesh Bansal, Sunnyvale, CA (US); Assaf Eisenberg, Chicago, IL (US)

(73) Assignee: Bytedance Inc., Wilmington, DE (US)

( * ) Notice: Subject to any disclaimer, the term of this patent is extended or adjusted under 35 U.S.C. 154(b) by 0 days.

(21) Appl. No.: 17/659,952

(22) Filed: Apr. 20, 2022

(65) Prior Publication Data
US 2022/0358553 A1    Nov. 10, 2022

Related U.S. Application Data

(63) Continuation of application No. 14/867,640, filed on Sep. 28, 2015, now Pat. No. 11,341,549.
(Continued)

(51) Int. Cl.
*G06Q 30/00* (2023.01)
*G06Q 30/0601* (2023.01)
*G06Q 50/00* (2012.01)

(52) U.S. Cl.
CPC ......... *G06Q 30/0605* (2013.01); *G06Q 50/01* (2013.01)

(58) Field of Classification Search
CPC ............... G06Q 30/00; G06Q 30/0601; G06Q 30/0605; G06Q 30/0207; G06Q 30/0208
See application file for complete search history.

(56) References Cited

U.S. PATENT DOCUMENTS

| | | | | |
|---|---|---|---|---|
| 8,290,471 | B1* | 10/2012 | Jones | H04L 12/1403 455/406 |
| 2003/0018561 | A1* | 1/2003 | Kitchen | G06Q 40/04 705/37 |

(Continued)

OTHER PUBLICATIONS

Drozda Jr, Joseph P., et al. "Constructing the informatics and information technology foundations of a medical device evaluation system: a report from the FDA unique device identifier demonstration." Journal of the American Medical Informatics Association 25.2 (2018) (Year: 2018).*

(Continued)

*Primary Examiner* — Christopher B Seibert
(74) *Attorney, Agent, or Firm* — Alston & Bird LLP

(57) ABSTRACT

Embodiments are provided that improve identification of user accounts for linking with a shared account, specifically user accounts suggested for linking with a consumer sharing account using specific electronically managed data to dynamically allocate data to the consumer sharing account. Some example embodiments detect electronic marketing information corresponding to user identifier(s) via a plurality of data sources, identify a consumer sharing account associated with a first user identifier, determine suggested user identifier(s) not associated with the consumer sharing account based on a portion of the electronic marketing information associated with the suggested user identifier(s), detect a transaction associated with the first user identifier, allocate at least a first portion of a dynamically-allocable transaction metric, and in response to detecting the transaction, cause generation at a first user device of a graphical user interface display that upon interaction causes sending of a consumer sharing account notification.

20 Claims, 10 Drawing Sheets

Related U.S. Application Data

(60) Provisional application No. 62/056,039, filed on Sep. 26, 2014.

(56) References Cited

U.S. PATENT DOCUMENTS

| | | | |
|---|---|---|---|
| 2003/0216933 A1* | 11/2003 | Kwan | G06Q 30/02 705/39 |
| 2006/0282356 A1* | 12/2006 | Andres | G06Q 40/00 705/37 |
| 2007/0179840 A1 | 8/2007 | Kroner et al. | |
| 2008/0082418 A1 | 4/2008 | Fordyce et al. | |
| 2008/0082420 A1* | 4/2008 | Kargman | G06Q 10/10 705/14.27 |
| 2008/0120129 A1* | 5/2008 | Seubert | G06Q 40/125 705/305 |
| 2008/0228580 A1* | 9/2008 | Korman | G06Q 30/02 705/14.27 |
| 2009/0171819 A1* | 7/2009 | Emde | G06Q 40/12 705/30 |
| 2009/0192873 A1* | 7/2009 | Marble | G06Q 20/10 705/14.1 |
| 2009/0198577 A1* | 8/2009 | Foreman | G06Q 20/102 705/40 |
| 2010/0250357 A1* | 9/2010 | Kim | G06Q 30/0277 707/723 |
| 2010/0287044 A1* | 11/2010 | Mason | G06Q 30/0211 705/14.23 |
| 2010/0287103 A1* | 11/2010 | Mason | G06Q 50/188 705/80 |
| 2011/0246279 A1 | 10/2011 | Joa et al. | |
| 2011/0313840 A1* | 12/2011 | Mason | H04W 4/029 705/14.35 |
| 2012/0095821 A1* | 4/2012 | Fuquen | G06Q 30/02 705/14.23 |
| 2012/0143656 A1* | 6/2012 | Murphy | G06Q 30/0283 705/14.1 |
| 2012/0252579 A1* | 10/2012 | Sethi | A63F 13/795 463/40 |
| 2013/0018802 A1* | 1/2013 | McCormick | G06Q 10/0631 705/301 |
| 2013/0024250 A1* | 1/2013 | Wu | G06Q 30/02 705/14.1 |
| 2013/0046590 A1* | 2/2013 | Abraham | G06Q 30/02 705/14.1 |
| 2013/0262209 A1* | 10/2013 | Boyer | G06Q 30/02 705/14.17 |
| 2013/0304527 A1* | 11/2013 | Santos, III | G06Q 30/0239 705/14.66 |
| 2013/0311315 A1 | 11/2013 | Scott | |
| 2014/0040041 A1* | 2/2014 | Ohnemus | G06Q 30/0643 705/14.66 |
| 2014/0297390 A1* | 10/2014 | Grindel | G06Q 30/0207 705/14.36 |
| 2014/0310077 A1* | 10/2014 | Narasimha | G06Q 30/0255 705/14.3 |
| 2014/0358738 A1* | 12/2014 | Ohnemus | G06Q 30/0601 705/27.2 |
| 2015/0095178 A1* | 4/2015 | Sanghavi | G06Q 30/0605 705/26.2 |
| 2015/0169727 A1* | 6/2015 | Araki | G06F 16/353 707/737 |
| 2016/0379301 A1* | 12/2016 | Feldman | G06Q 30/0605 705/26.2 |
| 2018/0012271 A1* | 1/2018 | Chen | G06Q 30/0605 |
| 2018/0130160 A1* | 5/2018 | Alexander | G06Q 50/40 |
| 2019/0073669 A1* | 3/2019 | Dutta | G06Q 20/40 |
| 2019/0175070 A1* | 6/2019 | Decker | A61B 5/1074 |
| 2019/0180350 A1* | 6/2019 | Marra | G06Q 30/0637 |
| 2019/0333087 A1* | 10/2019 | Appana | G06Q 20/348 |
| 2020/0242684 A1* | 7/2020 | Miyamae | G06Q 30/0627 |
| 2020/0294082 A1* | 9/2020 | Klein | G06Q 30/0242 |
| 2020/0294113 A1* | 9/2020 | Klein | G06Q 30/0275 |
| 2020/0402057 A1* | 12/2020 | Das | G06Q 20/405 |

OTHER PUBLICATIONS

U.S. Appl. No. 14/867,640, filed Sep. 28, 2015, U.S. Pat. No. 11,341,549, Issued.

Ben, British Airways Adds Family And Friends To Household Accounts, Dec. 12, 2013. from one mile at a time. (Year: 2013).

Marshall, Roger, et al. "Response-time measurement of group purchasing-decision power structures." Journal of Business Research 60.7 (2007): 711-719. (Year: 2007).

* cited by examiner

700

710

Receive, from the first consumer device associated with the first consumer account of the plurality of consumer accounts, the consumer identifier of a second consumer device

720

Send a consumer sharing account notification of the consumer sharing account to the second consumer device based on the consumer identifier (A)

FIG. 7

APPARATUSES, COMPUTER-IMPLEMENTED METHODS, AND COMPUTER PROGRAM PRODUCTS
FOR IMPROVED USER ACCOUNT
IDENTIFICATION FOR SHARED ACCOUNT
LINKING

CROSS-REFERENCE TO RELATED
APPLICATIONS

This application is a continuation of U.S. patent application Ser. No. 14/867,640, titled "APPARATUS, METHOD, AND COMPUTER PROGRAM PRODUCT FOR PROVIDING GROUP REWARDS," filed Sep. 28, 2015, which claims the benefit of U.S. Provisional Application No. 62/056,039, filed Sep. 26, 2014, which is incorporated by reference herein in its entirety.

FIELD

Example embodiments of the present invention relate generally to promotion management and, more particularly, to an apparatus, method, and computer program product for providing group rewards for transactions made using a promotion and marketing service.

BACKGROUND

Applicant has discovered problems with existing systems and methods for promotion management. Through applied effort, ingenuity, and innovation, Applicant has solved many of these identified problems by developing a solution that is embodied by the present invention and described in detail below.

BRIEF SUMMARY

An apparatus, method, and computer program product are therefore provided for providing group rewards via a promotional system.

A system configured to provide an electronic indication of a consumer group reward to at least one consumer account associated with a consumer group using a promotion framework, the system comprising e-commerce circuitry configured to perform, via a network interface, a transaction comprising transaction data associated with a promotion and determine at least one purchased promotion of a consumer account utilizing the transaction data, consumer sharing circuitry configured to associate, via the network interface, a transaction metric of the at least one purchased promotion to a consumer sharing account, group progression circuitry configured to determine a group progress count based on the transaction metric, and determine whether the group progress count exceeds a group progress threshold, and consumer sharing circuitry configured to associate at least a portion of the consumer group reward to the at least one consumer account in response to the group progress count exceeding the group progress threshold.

In some embodiments, the consumer sharing circuitry is further configured to associate at least a portion of the transaction metric to a plurality of consumer sharing accounts.

In some embodiments, the consumer sharing circuitry is further configured to receive one or more consumer identifiers, provide a consumer sharing account notification comprising an identification of the consumer sharing account to at least one consumer device based on the one or more consumer identifiers, and receive an indication of assignment of the consumer account to the consumer sharing account.

In some embodiments, the group progression circuitry is further configured to receive the indication of assignment of the transaction metric of the at least one purchased promotion to the consumer sharing account.

In some embodiments, the consumer sharing circuitry is further configured to provide a user interface for interacting with the consumer sharing account to the at least one consumer device associated with a plurality of consumer accounts, wherein the user interface comprises a consumer group identifier and a message feed configured to provide at least one of consumer messages, consumer sharing account notifications, or a digital progress indicator.

In some embodiments, the consumer sharing circuitry is further configured to receive, from the first consumer device associated with the first consumer account of the plurality of consumer accounts, the one or more consumer identifiers of a second consumer device, and send a consumer sharing account notification of the consumer sharing account to the second consumer device based on the one or more consumer identifiers.

In some embodiments, the e-commerce circuitry is further configured to determine at least one purchased promotion of a plurality of consumer accounts.

In some embodiments, the consumer sharing circuitry is configured to determine a maximum number of consumer accounts to associate to the consumer sharing account.

In some embodiments, the consumer sharing circuitry is configured to determine whether the at least one purchased promotion qualifies for association with the consumer sharing account.

In some embodiments, the transaction metric is associated to the consumer sharing account via at least one of a link, an icon, or a button.

In some embodiments, the consumer sharing circuitry configured to associate the transaction metric of the at least one purchased promotion to the consumer sharing account comprises group progression circuitry configured to monitor the group progress count during a group sharing period.

In some embodiments, the consumer sharing circuitry is further configured to receive an indication of removal of the transaction metric, and remove the transaction metric from the consumer sharing account, wherein removing the transaction metric from the consumer sharing account comprises decreasing the group progress count.

In some embodiments, the consumer sharing circuitry is further configured to receive an indication of re-assignment of the transaction metric, remove the transaction metric from the consumer sharing account, and associate the transaction metric to a second consumer sharing account, wherein removing the transaction metric from the consumer sharing account comprises decreasing the group progress count and associating the transaction metric to a second consumer sharing account comprises increasing a second group progress count.

In some embodiments, the consumer sharing circuitry configured to associate the consumer group reward to the at least one consumer account comprises circuitry configured to determine whether the consumer sharing account will proceed towards exceeding a plurality of group progress thresholds.

In some embodiments, the consumer sharing circuitry is further configured to provide a consumer sharing account notification of the consumer sharing account to a plurality of consumer devices associated with a plurality of consumer accounts, wherein the consumer sharing account notification comprises at least one of a consumer group identifier, a link, group sharing period, group progress count, or group progress threshold.

In some embodiments, the relevance circuitry is further configured to determine one or more consumer accounts to associate with the consumer sharing account, and indicate one or more consumers associated with the one or more consumer accounts to a consumer device associated with the consumer sharing account.

In some embodiments, the relevance circuitry is further configured to determine one or more promotions to associate with one or more consumer accounts associated with the consumer sharing account, and indicate the one or more promotions to the one or more consumer accounts associated with the consumer sharing account.

A machine implemented method for providing a consumer group reward to at least one consumer account associated with a consumer group using a promotion framework, the method comprising performing, via a network interface, a transaction comprising a promotion, determining, via processing circuitry, at least one purchased promotion of a consumer account, associating, via the processing circuitry, a transaction metric of the at least one purchased promotion to a consumer sharing account, determining, via the processing circuitry, a group progress count based on the transaction metric, determining, via the processing circuitry, whether the group progress count exceeds a group progress threshold, and associating, via the processing circuitry, at least a portion of the consumer group reward to the at least one consumer account in response to the group progress count exceeding the group progress threshold.

A system configured to provide an electronic indication of a consumer group reward to at least one consumer account associated with a consumer group, the system comprising means for performing, via a consumer account, a transaction comprising a promotion, means for determining at least one purchased promotion of the consumer account, means for associating a transaction metric of the at least one purchased promotion to a consumer sharing account, means for determining a group progress count based on the transaction metric, means for determining whether the group progress count exceeds a group progress threshold, and means for associating at least a portion of the consumer group reward to the at least one consumer account in response to the group progress count exceeding the group progress threshold.

A computer program product comprising a non-transitory computer readable storage medium storing instructions that, when executed by a processor, cause the processor to configure an apparatus to perform, via a consumer account, a transaction comprising a promotion, determine at least one purchased promotion of the consumer account, associate a transaction metric of the at least one purchased promotion to a consumer sharing account, determine a group progress count based on the transaction metric, determine whether the group progress count exceeds a group progress threshold, and associate at least a portion of the consumer group reward to the at least one consumer account in response to the group progress count exceeding the group progress threshold.

Additional features and advantages of the present invention will be set forth in portion in the description which follows, and in portion will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

The above summary is provided merely for purposes of summarizing some example embodiments to provide a basic understanding of some aspects of the invention. Accordingly, it will be appreciated that the above-described embodiments are merely examples and should not be construed to narrow the scope of the invention in any way. It will be appreciated that the scope of the invention encompasses many potential embodiments in addition to those here summarized, some of which will be further described below.

BRIEF DESCRIPTION OF THE DRAWINGS

Having therefore described certain example embodiments of the present disclosure in general terms, reference will now be made to the accompanying drawings, which are not necessarily drawn to scale, and wherein:

FIG. 7 illustrates a flowchart showing an exemplary process for expanding the group buying experience via consumer devices in accordance with some example embodiments discussed herein;

DETAILED DESCRIPTION OF VARIOUS EMBODIMENTS

Overview

Figure 1:
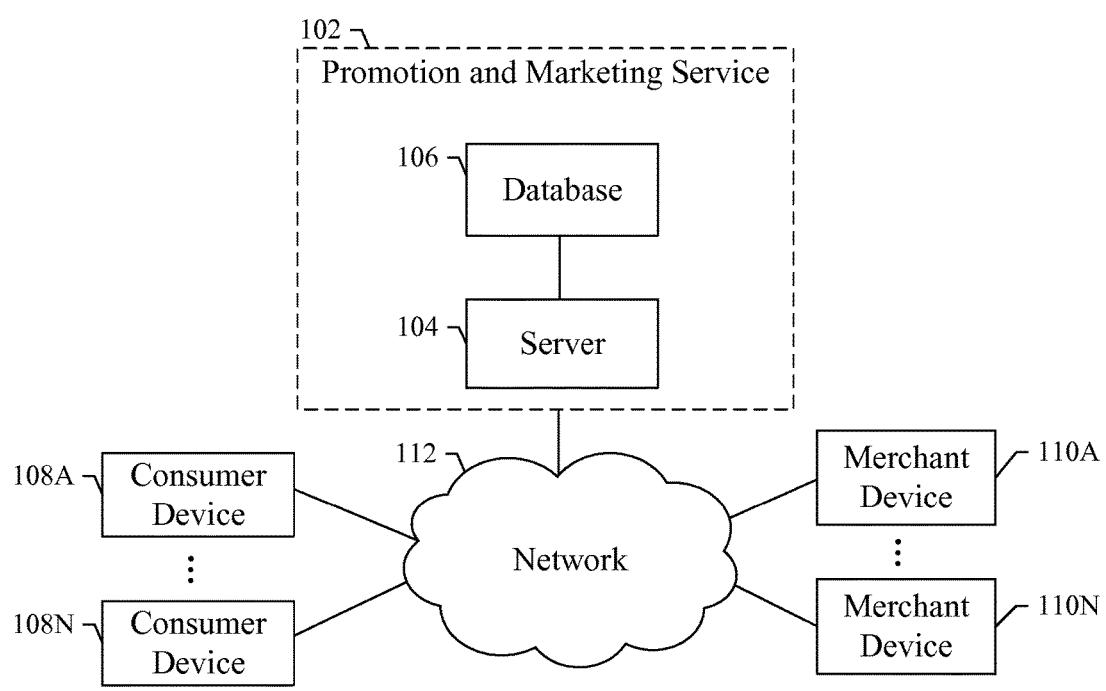
FIG. 1 illustrates a block diagram of an example system according to some example embodiments.

Various embodiments of the present invention are directed to improved apparatuses, methods, and computer readable media for providing a consumer group reward to a consumer account based upon transactions performed via a promotion and marketing service. Upon making a purchase, a promotion and marketing service may invite a consumer to join a group buying experience by generating an electronic marketing communication inviting a consumer to associate a purchased promotion to a consumer sharing account. The promotion and marketing service may provide the invitation to a consumer device. In response to the consumer "opting in" to the group buying experience, a promotion and marketing service, may be configured to associate a transaction metric associated with a purchased promotion of a consumer account to at least one consumer sharing account. The transaction metric may be associated to a dynamically generated consumer sharing account (e.g., a newly created consumer sharing account started by a consumer) or to a previously generated consumer sharing account which is displayed via a consumer device. To generate a consumer sharing account the promotion and marketing service may receive a request from a consumer device to generate a consumer sharing account. The consumer sharing account request may be processed by a server and displayed as, for example, a web page via a browser.

Through the use of a consumer sharing account, consumers in the group may be rewarded based on cumulative contributions of transaction metrics (e.g., the total amount spent, units purchased, or number of contributors) as group progress thresholds are exceeded during a group sharing period (e.g., a pre-determined period of time). Embodiments as described herein may provide for improved interactions with a consumer sharing account by allowing consumers to dynamically join and leave groups, to assign or reassign transaction metrics to different consumer sharing accounts, and to reward consumers in proportion to their contributions to any particular consumer sharing account.

In some example embodiments, the promotion and marketing service may offer a consumer the opportunity to receive a reward upon completing the purchase of a promotion by "opting in" to a group sharing account. When the consumer opts in to the consumer sharing account, the consumer may be presented with the option to add a transaction metric associated with their purchase to a particular consumer sharing account. For example, the consumer may be presented with a list of established consumer sharing accounts. Alternatively, the consumer may be presented with the option to create a new consumer sharing account. Upon creation of the consumer sharing account, the promotion and marketing service may receive, from the consumer, consumer identifiers (e.g., email addresses, telephone numbers, mobile messaging identifier, etc.) correlated to other consumers to invite to the group buying experience.

Using the consumer identifiers, the promotion and marketing service may send a consumer sharing account notification to the other consumers. The consumer sharing account notification may indicate the newly established consumer sharing account and invite the other consumers to join the consumer sharing account. The consumer sharing account notification may include interface controls (e.g., a link) that, when selected, associates a consumer account associated with the other consumer with the newly established consumer sharing account. Once the other consumer is associated with the consumer sharing account, the other consumer may be prompted to associate any future purchases with the consumer sharing account. Purchases made by the other consumer and associated with the consumer sharing account may have their associated transaction metrics added to the consumer sharing account. These transaction metrics may increase the progress of the consumer sharing account towards group progress thresholds that affect the rewards received by the members of the consumer sharing account.

Further, the promotion and marketing service as described herein may enhance a group buying experience by providing consumer sharing flexibility to assign partial contributions of a transaction metric to a plurality of consumer sharing accounts. In some embodiments, transaction metrics may be dynamically re-assignable by consumers. For example, such transaction metrics contributed to a particular consumer sharing account may be removed from the consumer sharing account or re-assigned to another consumer sharing account until the group sharing period expires and/or until the consumer sharing account provides a reward. Upon such assignment, removal, and/or re-assignments of transaction metrics, the promotion and marketing service may generate consumer sharing account notifications to notify other consumers in the group of the activity involving the consumer sharing account.

Definitions

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and that is operable to provide promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like. The service is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce. The "provider" or "merchant" need not actually market a product or service via the promotion and marketing service, as some merchants or providers may utilize the promotion and marketing service only for the purpose of gathering marketing information, demographic information, or the like.

As used herein, the term "consumer" should be understood to refer to a recipient of goods, services, promotions, media, or the like provided by the promotion and marketing service and/or a merchant. Consumers may include, without limitation, individuals, consumer groups (e.g., groups of individuals), corporations, other merchants, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

For example, consider a promotion offered by the promotion and marketing service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

Promotions may be provided to consumers and redeemed via the use of an "instrument." Instruments may represent and embody the terms of the promotion from which the instrument resulted. For example, instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" refers to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to communications, displays, or other perceived indications, such as e-mails, text messages, application alerts, mobile applications, other type of electronic interface or distribution channel and/or the like, of one or more promotions.

As used herein, the term "electronic marketing information" refers to various electronic data and signals that may be interpreted by a promotion and marketing service to provide improved electronic marketing communications. Electronic marketing information may include, without limitation, clickstream data (defined below), transaction data (defined below), location data (defined below), communication channel data (defined below), discretionary data (defined below), or any other data stored by or received by the promotion and marketing service for use in providing electronic communications to consumers.

As used herein, the term "clickstream data" refers to electronic information indicating content viewed, accessed, edited, or retrieved by consumers. This information may be electronically processed and analyzed by a promotion and marketing service to improve the quality of electronic marketing and commerce transactions offered by, through, and in conjunction with the promotion and marketing service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like.

As used herein, the term "transaction data" refers to electronic information indicating that a transaction is occurring or has occurred via either a merchant or the promotion and marketing service. Transaction data may also include information relating to the transaction. For example, transaction data may include consumer payment or billing information, consumer shipping information, items purchased by the consumer, a merchant rewards account number associated with the consumer, the type of shipping selected by the consumer for fulfillment of the transaction, or the like.

As used herein, the term "location data" refers to electronic information indicating a particular location. Location data may be associated with a consumer, a merchant, or any other entity capable of interaction with the promotion and marketing service. For example, in some embodiments location data is provided by a location services module of a consumer mobile device. In some embodiments, location data may be provided by a merchant indicating the location of consumers within their retail location. In some embodiments, location data may be provided by merchants to indicate the current location of the merchant (e.g., a food truck or delivery service). It should be appreciated that location data may be provided by various systems capable of determining location information, including, but not limited to, global positioning service receivers, indoor navigation systems, cellular tower triangulation techniques, video surveillance systems, or radio frequency identification (RFID) location systems.

As used herein, the term "communication channel data" refers to electronic information relating to the particular device or communication channel upon which a merchant or consumer communicates with the promotion and marketing service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the promotion and marketing service), or any other data pertaining to the communication channel between the promotion and marketing service and an entity external to the promotion and marketing service.

As used herein, the term "discretionary data" refers to electronic information provided by a merchant or consumer explicitly to the promotion and marketing service in support of improved interaction with the promotion and marketing service. Upon registering with the promotion and marketing service or at any time thereafter, the consumer or merchant may be invited to provide information that aids the promotion and marketing service in providing services that are targeted to the particular needs of the consumer or merchant. For example, a consumer may indicate interests, hobbies, their age, gender, or location when creating a new account. A merchant may indicate the type of goods or services provided, their retail storefront location, contact information, hours of operation, or the like.

It should be appreciated that the term "discretionary data" is intended to refer to information voluntarily and explicitly provided to the promotion and marketing service, such as by completing a form or survey on a website or application hosted by the promotion and marketing service. However, it should be appreciated that the examples of discretionary data provided above may also be determined implicitly or through review or analysis of other electronic marketing information provided to the promotion and marketing service. It should also be appreciated that the promotion and marketing service may also gate access to certain features or tools based on whether certain discretionary data has been provided. For example, the consumer may be required to provide information relating to their interests or location during a registration process.

As used herein, the term "offering parameters" refers to terms and conditions under which the promotion is offered by a promotion and marketing service to consumers. These offering parameters may include parameters, bounds, considerations and/or the like that outline or otherwise define the terms, timing, constraints, limitations, rules or the like under which the promotion is sold, offered, marketed, or otherwise provided to consumers. Example offering parameters include, using the aforementioned restaurant as the example provider, limit one instrument per person, total of 100 instruments to be issued, a run duration of when the promotion will be marketed via the promotion and marketing service, and parameters for identifying consumers to be offered the promotion (e.g., factors influencing how consumer locations are used to offer a promotion).

As used herein, the term "redemption parameters" refers to terms and conditions for redeeming or otherwise obtaining the benefit of promotions obtained from a promotion and marketing service. The redemption parameters may include parameters, bounds, considerations and/or the like that outline the term, timing, constraints, limitations, rules or the like for how and/or when an instrument may be redeemed. For example, the redemption parameters may include an indication that the instrument must be redeemed prior to a specified deadline, for a specific good, service or experience and/or the like. For example, using the aforementioned restaurant as the example provider, the redemption parameters may specify a limit of one instrument per visit, that the promotion must be used in store only, or that the promotion must be used by a certain date.

As used herein, the term "promotion content" refers to display factors or features that influence how the promotion is displayed to consumers. For example, promotion content may include an image associated with the promotion, a narrative description of the promotion or the merchant, a display template for association with the promotion, or the like. For example, merchant self-service indicators (defined below) may be used to identify promotion offers that were generated by merchants with similar characteristics to the merchant self-service indicators. Various other factors may be used to generate the promotion offer, such as the success of the promotion offers generated by the merchants with similar characteristics, the product availability of the merchant, and the like.

As used herein, the term "promotion component" is used to refer to elements of a particular promotion that may be selected during a promotion generation process. Promotion components may include any aspect of a promotion, including but not necessarily limited to offering parameters, redemption parameters, and promotion content. For example, promotion components may include, but are not limited to, promotion titles, promotion ledes (e.g., a short text phrase displayed under a promotion title), promotion images, promotion prices, promotion discount levels, promotion style sheets, promotion fonts, promotion e-mail subjects, promotion quantities, promotion fine print options, promotion fees assessed to the merchant by the promotion and marketing service, or the like. Promotion components may also include various flags and settings associated with registration and verification functions for a merchant offering the promotion, such as whether the identity of the merchant has been verified, whether the merchant is registered with the promotion and marketing service, or the like.

As used herein, the term "electronic marketing communication" refers to any electronically generated information content provided by the promotion and marketing service to a consumer for the purpose of marketing a promotion, good, or service to the consumer. Electronic marketing communications may include any email, short message service (SMS) message, web page, application interface, or the like electronically generated for the purpose of attempting to sell or raise awareness of a product, service, promotion, or merchant to the consumer. Electronic marketing communications may include consumer sharing account notifications. As used herein, the term "consumer sharing account notification" includes any electronic marketing communication to a consumer that notifies the consumer of progress of a consumer sharing group, invites or otherwise notifies the consumer of the existence and/or opportunity to join a consumer sharing group, notifies the consumer of a duration or remaining time for contributing to a consumer sharing group, notifying the consumer of activity within the group (e.g., a notification that another consumer has contributed to the group), or the like.

It should be appreciated that the term "electronic marketing communication" implies and requires some portion of the content of the communication to be generated via an electronic process. For example, a telephone call made from an employee of the promotion and marketing service to a consumer for the purpose of selling a product or service would not qualify as an electronic marketing communication, even if the identity of the call recipient was selected by an electronic process and the call was dialed electronically, as the content of the telephone call is not generated in an electronic manner. However, a so-called "robo-call" with content programmatically selected, generated, or recorded via an electronic process and initiated by an electronic system to notify a consumer of a particular product, service, or promotion would qualify as an electronic marketing communication. Similarly, a manually drafted e-mail sent from an employee of the promotion and marketing service to a consumer for the purpose of marketing a product would not qualify as an electronic marketing communication. However, a programmatically generated email including marketing materials programmatically selected based on electronic marketing information associated with the recipient would qualify as an electronic marketing communication.

As used herein, the term "business analytic data" refers to data generated by the promotion and marketing service based on electronic marketing information to assist with the operation of the promotion and marketing service and/or one or more merchants. The various streams of electronic marketing information provided to and by the promotion and marketing service allow for the use of sophisticated data analysis techniques that may be employed to identify correlations, relationships, and other associations among elements of electronic marketing information. These associations may be processed and formatted by the promotion and marketing service to provide reports, recommendations, and services both internal to the promotion and marketing service and to merchants in order to improve the process by which merchants and promotion and marketing service engage with consumers. For example, the promotion and marketing service may analyze the electronic marketing information to identify an increased demand for a particular product or service, and provide an electronic report to a merchant suggesting the merchant offer the particular product or service. Alternatively, the promotion and marketing service may identify that a particular product or service is not selling or resulting in the merchant losing money, customers, or market share (e.g., after consumers order a particular menu item, they never come back to the merchant), and suggest that the merchant should discontinue offering that product or service.

It should be appreciated that the term "business analytic data" is intended to refer to electronically and programmatically generated data. For example, a printed report or letter manually drafted by an employee of the promotion and marketing service would not be said to include business analytic data, even if said data was used by the employee during the drafting process, while a data disk or downloaded file containing analytics generated by the promotion and marketing service would be considered business analytic data.

In some embodiments, a consumer may be associated with a consumer account. As used herein, the term "consumer account" should be understood to refer to an account which may include consumer data, transaction data (e.g., consumer payment information or billing information), and promotions of interest associated with a particular consumer. In the present context, "consumer data" is understood to refer to any electronic data that identifies particular characteristics of a particular consumer (e.g., a name, address, age, interests, or the like). A consumer account may be associated with one or more promotions. A consumer account may be associated with both promotions purchased or otherwise redeemable by the consumer (e.g., promotions for which the consumer possesses a valid instrument or other redemption mechanism), and unpurchased and/or unredeemable promotions. For example, a given consumer account may have purchased several promotions which may be redeemable through the use of a voucher or redemption code. For example, a consumer account may be associated with a promotion for "2 Soups, 2 Entrees, and 2 Drinks" from a restaurant and a promotion for "Teeth Whitening" from a local dentist. The same consumer account may be associated with several promotions that were identified as of interest to the consumer based on electronic marketing information associated with the consumer. Such unpurchased promotions may be provided to the consumer by the promotion and marketing service using an electronic marketing communication. For example, if the consumer has provided discretionary data indicating they have an interest in skiing, promotions for lift tickets at nearby ski resorts may be associated with the account to be shown to the consumer the next time the consumer accesses a website hosted by the promotion and marketing service.

As used herein, the term "transaction metric" may include, but is not limited to, any type of monetary value, unit, number, and/or weight associated with a transaction performed via a promotion and marketing service. It should be appreciated that transaction metrics for a given transaction may be defined, determined, and/or weighted in a variety of manners in accordance with the examples described herein.

For example, if the "2 Soups, 2 Entrees, and 2 Drinks" promotion described above was purchased by the consumer from the promotion and marketing service for $10, the purchase transaction may be associated with a transaction metric in the amount of $10. It should be appreciated that, in embodiments wherein the transaction metric comprises a monetary value, the monetary value may be determined in a variety of ways. For example, the monetary value may correspond to a particular ratio or fraction applied to the cost value, residual value, promotional value, or accepted value of the promotion. It should also be appreciated that, in some embodiments, transaction metrics may correspond to the total value of a given transaction, even if the transaction includes multiple promotions (e.g., a scenario in which the consumer purchases three promotions at a time).

In some embodiments, the transaction metric may be determined based on additional or alternative factors. A particular promotion or set of promotions may be selected as providing a bonus to transaction metrics associated with the sale of said promotions. For example, a promotion and marketing service may mark one or more promotions as "Special Offers" that double an associated transaction metric for a limited time, increasing any contribution from the purchase of said one or more promotions to a consumer sharing account. In other embodiments, different promotions may be associated with different types of transaction metrics. In yet further embodiments, different types of promotions may be associated with different transaction metrics. For example, in a scenario where a promotion and marketing service sells both promotions and goods, some embodiments may measure different transaction metrics for transactions involving promotions and transactions involving goods, such that such transaction metrics are tracked independently within a consumer sharing account. In other embodiments, the transaction metric may be independent of the price or value of the promotions purchased. For example, the transaction metric may track a number of transactions, irrespective of the price of said transactions.

The term "consumer sharing account" should be understood to refer to an account that holds and/or accumulates one or more transaction metrics contributed to the account based on purchased promotions associated with one or more consumer accounts. Referring to the aforementioned example of the "2 Soups, 2 Entrees, and 2 Drinks" promotion, the transaction metric including a monetary value of $10 may be associated to the consumer sharing account, incrementing a group progress count associated with the account by $10. The transaction metric may be contributed in whole or in part to one or more consumer sharing accounts. For example, the transaction metric may be divided across two or more consumer sharing accounts (e.g., $6 to a first consumer sharing account and $4 to a second consumer sharing account).

In some embodiments, the consumer sharing account may be subject to an assignment or removal of a transaction metric associated with a promotion during a group sharing period. The term "group sharing period" may be understood to reference a period of time during which transaction metrics associated with purchases performed via the promotion and marketing service may be assigned to or removed from the consumer sharing account. For example, a transaction metric may not be assigned to or remove from a consumer sharing account after a group sharing period of three days has expired. The group sharing period may further define the period for which consumer group rewards are calculated. After the group sharing period has terminated, a reward may be provided to consumers that contributed to the consumer sharing account based on the group progress count in comparison to one or more group progress thresholds.

As used herein, the term "group progress count" may be understood to refer to a number, amount, calculation, or accumulation of one or more transaction metrics which may represent an electronic status of the consumer sharing account.

As used herein, the term "consumer group reward" should be understood to refer to a refund, gift certificate, incentive, credit, discount, or other benefit provided to individual consumer accounts associated with a consumer sharing account in recognition of a group progress count exceeding a group progress threshold (defined below).

The term "group progress threshold" may indicate a number or aggregated amount of transaction metrics that must be associated with the consumer sharing account before a consumer group reward may be provided to one or more consumer accounts. Upon the group progress count exceeding the group progress threshold, the promotion and marketing service may award the consumer group reward to consumer accounts associated with the consumer sharing account. For example, consumer accounts associated with a particular consumer sharing account may be provided with a credit and/or refund (e.g., a 5% refund of transactions for which consumers associated transaction metrics with the consumer sharing account) when the group progress count exceeds a particular group progress threshold (e.g., $100).

As used herein, the term "digital progress indicator" refers to an interface element that illustrates the relationship between the group progress count and the group progress threshold(s) associated with a consumer sharing account. In some embodiments, a given consumer sharing account may have a plurality of digital progress indicators, such as in cases where rewards are determined based on a plurality of transaction metrics. The digital progress indicator may be used to indicate the progress of contributions made towards the consumer sharing account. In some embodiments, a digital progress indicator may refer to a digital progress bar, digital image, or the like. In further example embodiments, a digital progress indicator may provide a visual indication of a group progress count in relation to a group progress threshold.

It should be appreciated that the term "consumer group data" is intended to refer to electronic information indicative of a consumer group (e.g., a consumer group description, number of group members, group member maximum value, group member minimum value, member availability, promotion type, and/or the like) provided via a consumer account or consumer sharing account. In some embodiments the promotion and marketing service may receive consumer group data that indicates an assignment of a consumer account to a consumer sharing account. In other embodiments, consumer group data may be processed and analyzed by a promotion and marketing service to identify relevant promotions and/or consumers associated with or to be associated with consumer accounts.

The term "group reward data" is intended to refer to electronic information indicative of a group reward (e.g., consumer group reward, maximum value of group reward, minimum value of group reward and/or the like) provided, via a consumer sharing account. Group reward data may be processed and analyzed by a promotion and marketing service to determine a group progress threshold to associate with a consumer sharing account.

Technical Underpinnings and Implementation of Exemplary Embodiments

Merchants, including manufacturers, wholesalers, and retailers, have spent a tremendous amount of time, money, manpower, and other resources to determine the best way to market their products to consumers. Whether a given marketing effort is successful is often determined based on the return-on-investment offered to the merchant from increased awareness, sales, and the like of the merchant's goods and services in exchange for the resources spent on the marketing effort. In other words, optimal marketing techniques generally maximize the benefit to the merchant's bottom line while minimizing the cost spent on marketing. To this end, a merchant's marketing budget may be spent in a variety of different manners including advertising, offering of discounts, conducting market research, and various other known marketing techniques. The end goal of these activities is to ensure that products are presented to consumers in a manner that maximizes the likelihood that the consumers will purchase the product from the merchant that performed the marketing activities while minimizing the expense of the marketing effort.

The advent of electronic commerce has revolutionized the marketing process. While merchants would typically have to perform costly market research such as focus groups, surveys, and the like to obtain detailed information on consumer preferences and demographics, the digital age has provided a wealth of new consumer information that may be used to optimize the marketing and sales process. As a result, new technologies have been developed to gather, aggregate, analyze, and report information from a variety of electronic sources.

So-called "clickstream data" provides a robust set of information describing the various interactions consumers have with electronic marketing information provided to them by merchants and others. Promotion and marketing services have been developed with sophisticated technology to receive and process this data for the benefit of both merchants and consumers. These services assist merchants with marketing their products to interested consumers, while reducing the chance that a consumer will be presented with marketing information in which the consumer has no interest. Some promotion and marketing services further leverage their access to the trove of electronic marketing information to assist merchants and consumers with other tasks, such as offering improved merchant point-of-sale systems, improved inventory and supply chain management, improved methods for delivering products and services, and the like.

Unlike conventional marketing techniques related to the use of paper or other physical media (e.g., coupons clipped from a weekly newspaper), promotion and marketing services offer a wealth of additional electronic solutions to improve the experience for consumers and merchants. The ability to closely monitor user impressions provides the ability for the promotion and marketing service to gather data related to the time, place, and manner in which the consumer engaged with the impression (e.g., viewed, clicked, moused-over) and obtained and redeemed the promotion. The promotion and marketing service may use this information to determine which products and services are most relevant to the consumer's interest, and to provide marketing materials related to said products and services to the consumer, thus improving the quality of the electronic marketing communications received by the consumer. Merchants may be provided with the ability to dynamically monitor and adjust the parameters of promotions offered by the promotion and marketing service, ensuring that the merchant receives a positive return on their investment. For example, the merchant can closely monitor the type, discount level, and quantity sold of a particular promotion on the fly, while with traditional printed coupons the merchant would not be able to make any changes to the promotion after the coupon has gone to print. Each of these advancements in digital market and promotion distribution involve problems unique to the digital environment not before seen in traditional print or television broadcast marketing.

However, these promotion and marketing services are not without problems. Although the clickstream data provides a wealth of information, the inventors have determined that existing techniques may not always leverage this information in an efficient or accurate manner. Technology continues to rapidly advance in the field of analytics and the processing of this information, offering improved data gathering and analysis techniques, resulting in more relevant and accurate results provided in a more efficient manner. Electronic marketing services continue to evolve and provide improved methods for engaging consumers and spreading awareness of products offered by promotion and marketing services.

In many cases, the inventors have determined that these services are constrained by technological obstacles unique to the electronic nature of the services provided, such as constraints on data storage, machine communication and processor resources. The inventors have identified that the wealth of electronic data available to these services and the robust nature of electronic marketing communications techniques present new challenges never contemplated in the world of paper coupons and physical marketing techniques. The inventors have further determined that even technological methods that leverage computers for statistical analysis and consumer behavior modeling (e.g., television rating systems) fail to address problems associated with providing relevant, high quality electronic marketing communications (e.g., impressions) to consumers in a manner that maximizes accuracy, minimizes error, is user friendly and provides for efficient allocation of resources. Embodiments of the present invention as described herein serve to correct these errors and offer improved resource utilization, thus providing improvements to electronic marketing services that address problems arising out of the electronic nature of those services.

The inventors have identified various problems and difficulties that occur in providing group rewards via a promotional system. For example, previous efforts at providing group buying experiences required consumers to each purchase the same product or promotion. However, these product or promotion-centric group buying experiences limit the ability of the consumer group to expand the number of participating consumers, since the group is necessarily constrained to consumers who are interested in the particular product or service. For example, a promotion-centric group buying experience may require a particular number of consumers in a group to purchase the same promotion before any consumers are provided a reward. As a particular example, a particular promotion for a 30 minute massage may require participation by five consumers to obtain a 10% discount or cash back reward. Such a group buying experience would therefore require five consumers to establish a group purchase of the massage promotion. Such groups may incentivize purchasing consumers to tell other consumers about the group purchase, but other consumers with no interest in a massage are unlikely to join the group purchase. Therefore, the ability to expand the group is reduced due to the inflexibility of the promotions which may be associated with the consumer group.

Additionally, the inventors have determined that basing the group buying experience on one particular promotion limits the incentives to keep buying and/or contributing. For example, requiring consumers participating in a consumer group to purchase a particular promotion may result in a promotion purchase ceiling (e.g., a maximum quantity of a particular promotion a consumer is willing to purchase). Groups that have a shared interest in one promotion type (e.g., a massage) may not have a shared interest in other promotion types (e.g., restaurants), such that it may be difficult to keep groups together for multiple group purchases. As a result, consumers are not incentivized to continue purchasing promotions with the same group.

The inventors have therefore determined that existing electronic systems fail to address these issues. As a result of these problems and others that may arise from time to time, limitations and inefficiencies may be introduced into the process of providing group rewards. Therefore, the inventors have solved for such identified shortcomings taking into account the need for an improved group buying experience. In particular, the system developed by the inventors is configured to provide consumer group rewards to consumer accounts associated with a consumer sharing account based on transaction metrics associated with various promotions purchased and/or selected by each individual consumer.

System Architecture and Example Apparatus

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system within which embodiments of the present invention may operate. Merchants may access a promotion and marketing service 102 via a network 112 (e.g., the Internet, or the like) using computer devices 108A through 108N and 110A through 110N, respectively (e.g., one or more consumer devices 108A-108N or one or more merchant devices 110A-110N). Moreover, the promotion and marketing service 102 may comprise a server 104 in communication with a database 106.

The server 104 may be embodied as a computer or computers as known in the art. The server 104 may provide for receiving of electronic data from various sources, including but not necessarily limited to the consumer devices 108A-108N and the merchant devices 110A-110N. For example, the server 104 may be operable to receive and process clickstream data provided by the consumer devices 108 and/or the merchant devices 110. The server 104 may also facilitate e-commerce transactions based on transaction information provided by the consumer devices 108 and/or the merchant devices 110. The server 104 may facilitate the generation and providing of various electronic communications and marketing materials based on the received electronic data.

The database 106 may be embodied as a data storage device such as a Network Attached Storage (NAS) device or devices, or as a separate database server or servers. The database 106 includes information accessed and stored by the server 104 to facilitate the operations of the promotion and marketing service 102. For example, the database 106 may include, without limitation, user account credentials for system administrators, merchants, and consumers, data indicating the products and promotions offered by the promotion and marketing service, clickstream data, analytic results, reports, financial data, and/or the like.

The consumer devices 108A-108N may be any computing device as known in the art and operated by a consumer. Electronic data received by the server 104 from the consumer devices 108A-108N may be provided in various forms and via various methods. For example, the consumer devices 108A-108N may include desktop computers, laptop computers, smartphones, netbooks, tablet computers, wearables, and the like. The information may be provided through various sources on these consumer devices.

In embodiments where a consumer device 108 is a mobile device, such as a smart phone or tablet, the consumer device 108 may execute an "app" to interact with the promotion and marketing service 102. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The promotion and marketing service 102 may leverage the application framework offered by the mobile operating system to allow consumers to designate which information is provided to the app and which may then be provided to the promotion and marketing service 102. In some embodiments, consumers may "opt in" to provide particular data to the promotion and marketing service 102 in exchange for a benefit, such as improved relevancy of marketing communications offered to the user. In some embodiments, the consumer may be provided with privacy information and other terms and conditions related to the information provided to the promotion and marketing service 102 during installation or use of the app. Once the consumer provides access to a particular feature of the mobile device, information derived from that feature may be provided to the promotion and marketing service 102 to improve the quality of the consumer's interactions with the promotion and marketing service.

For example, the consumer may indicate that they wish to provide location information to the app from location services circuitry included in their mobile device. Providing this information to the promotion and marketing service 102 may enable the promotion and marketing service 102 to offer promotions to the consumer that are relevant to the particular location of the consumer (e.g., by providing promotions for merchants proximate to the consumer's current location). It should be appreciated that the various mobile device operating systems may provide the ability to regulate the information provided to the app associated with the promotion and marketing service 102. For example, the consumer may decide at a later point to disable the ability of the app to access the location services circuitry, thus limiting the access of the consumer's location information to the promotion and marketing service 102.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion. It should be appreciated that the use of mobile technology and associated app frameworks may provide for particularly unique and beneficial uses of the promotion and marketing service through leveraging the functionality offered by the various mobile operating systems.

Additionally or alternatively, the consumer device 108 may interact through the promotion and marketing service 102 via a web browser. As yet another example, the consumer device 108 may include various hardware or firmware designed to interface with the promotion and marketing service 102 (e.g., where the consumer device 108 is a purpose-built device offered for the primary purpose of communicating with the promotion and marketing service 102, such as a store kiosk).

The merchant devices 110A-110N may be any computing device as known in the art and operated by a merchant. For example, the merchant devices 110A-110N may include a merchant point-of-sale, a merchant e-commerce server, a merchant inventory system, or a computing device accessing a web site designed to provide merchant access (e.g., by accessing a web page via a browser using a set of merchant account credentials). Electronic data received by the promotion and marketing service 102 from the merchant devices 110A-110N may also be provided in various forms and via various methods. For example, the merchant devices 110A-110N may provide real-time transaction and/or inventory information as purchases are made from the merchant. In other embodiments, the merchant devices 110A-110N may be employed to provide information to the promotion and marketing service 102 to enable the promotion and marketing service 102 to generate promotions or other marketing information to be provided to consumers.

An example of a data flow for exchanging electronic information among one or more consumer devices, merchant devices, and the promotion and marketing service is described below with respect to FIG. 3.

Example Apparatuses for Implementing Embodiments of the Present Invention

Figure 2A:
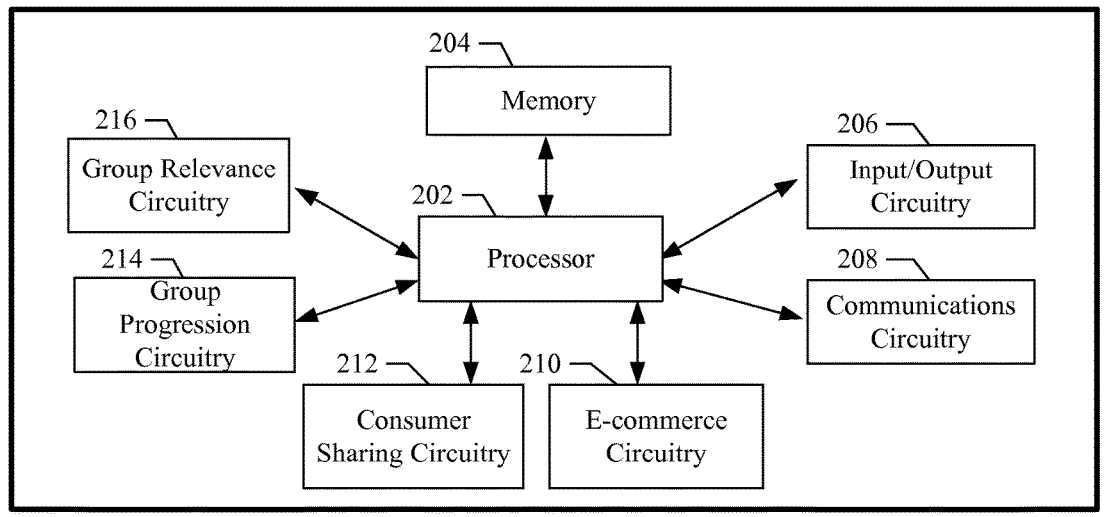
FIG. 2a illustrates a block diagram showing an example server for implementing a consumer sharing account using special-purpose circuitry in accordance with some example embodiments of the present invention.

The server 104 may be embodied by one or more computing systems, such as apparatus 200A shown in FIG. 2a. As illustrated in FIG. 2a, the apparatus 200A may include a processor 202, a memory 204, input/output circuitry 206, communications circuitry 208, e-commerce circuitry 210, consumer sharing circuitry 212, group progression circuitry 214, and group relevance circuitry 216. The apparatus 200A may be configured to execute the operations described above with respect to FIG. 1 and below with respect to FIGS. 3-10. Although these components 202-216 are described with respect to functional limitations, it should be understood that the particular implementations necessarily include the use of particular hardware. It should also be understood that certain of these components 202-216 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200A may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200A may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200A. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The e-commerce circuitry 210 includes hardware configured to perform a transaction including a promotion offered by a promotion and marketing service. The e-commerce circuitry 210 may be configured to determine at least one promotion purchased by a consumer account. For example, the e-commerce circuitry 210 may provide an e-commerce interface. The e-commerce interface may generate consumer sharing account notifications and/or receive transaction data to facilitate transactions, such as purchases, performed via a promotion and marketing service. The e-commerce circuitry 210 may determine at least one purchased promotion by analyzing transaction data associated with a consumer account. In some embodiments, the e-commerce circuitry 210 may manage promotions stored in memory, for example memory 204, by identifying which promotions are associated with particular consumer accounts.

The e-commerce circuitry 210 may receive clickstream data and/or transaction data via a network interface provided by the communications circuitry 224. Such clickstream data may be utilized by the e-commerce circuitry 210 to identify promotions viewed and/or accessed by consumers. In some embodiments, the e-commerce circuitry 210 may analyze transaction data to identify consumer accounts that include a minimum value of purchased promotions (e.g., a minimum of five or more purchased promotions). The e-commerce circuitry 210 may utilize processing circuitry, such as the processor 202, to perform these actions. However, it should also be appreciated that, in some embodiments, the e-commerce circuitry 210 may include a separate processor, specially configured field programmable gate array (FPGA), or application specific interface circuit (ASIC) to determine at least one purchased promotion of a consumer account or a plurality of consumer accounts. The e-commerce circuitry 210 is therefore implemented using hardware components of the apparatus configured by either hardware or software for implementing these planned functions.

The consumer sharing circuitry 212 includes hardware configured to associate a transaction metric of at least one purchased promotion to a consumer sharing account. The consumer sharing circuitry 212 may be configured to associate at least a portion of the transaction metric to a plurality of consumer sharing accounts. For example, a transaction metric may include a transaction value "10" for a Massage promotion. The transaction value may be predetermined by the consumer sharing circuitry 212 or generated dynamically by the consumer sharing circuitry 212. The assigned transaction value may be stored in, for example, the memory 204. The consumer sharing circuitry 212 may associate the transaction value 10 to the consumer sharing account in response to Consumer X clicking a link to assign the promotion and/or the transaction metric to the consumer sharing account.

The promotion and marketing service 102 may be configured to limit the number of consumer accounts associated with a consumer sharing account. As such, the consumer sharing circuitry 212 may be configured to determine a maximum number of consumer accounts to associate to the consumer sharing account. The maximum number of consumer accounts may be stored in the memory 204 by the consumer sharing circuitry 212.

In other embodiments, the consumer sharing circuitry 212 may be configured to determine whether the at least one purchased promotion qualifies for association with the consumer sharing account. In some example embodiments, the determination may be based on the promotion order date. For example, the consumer sharing circuitry 212 may determine a particular promotion may qualify for association with a consumer sharing account in response to a particular request to associate Massage Promo A to the consumer sharing account within 24 hours of the promotion order date.

In other examples, a determination may be based on a comparison of a transaction metric to predetermined qualifier. For example, the consumer sharing circuitry 212 may determine transaction value "10" is greater than a predetermined qualifier "5"; therefore, Massage Promo A qualifies for association with a consumer sharing account.

The consumer sharing circuitry 212 may be configured to provide an indication to a consumer device as to whether at least one purchase promotion qualifies for association with a consumer sharing account. The indication may be provided via an icon, notification, or the like provided to a consumer device 108A.

The consumer sharing circuitry 212 may be configured to invite other consumers to participate in the group buying experience. As such, the consumer sharing circuitry 212 may be configured to receive one or more consumer identifiers. As used herein, the term "consumer identifier" may include a word, number, unique identifier, email address, telephone number, mobile messaging identifier (e.g., a mobile messaging user ID), or combination thereof associated with a consumer account. In some embodiments, consumer sharing circuitry 212 may be configured to receive one or more consumer identifiers via the consumer device 108A, database 106, third party website, and/or application interface. For example, the consumer sharing circuitry 212 may receive consumer identifiers (e.g., one or more email addresses), such as "dan@emailme.com," "susan@mymail.com," tom@emailme.com," and "joy@mymail.com" provided by a consumer device 108A. Each consumer identifier may be associated with a corresponding consumer account, social media account, email account, mobile account, or cloud computing account.

In some embodiments, the consumer sharing circuitry 212 may be further configured to provide a consumer sharing account notification comprising an identification of the consumer sharing account to at least one consumer device 108N. The consumer sharing account notification may be based on the one or more consumer identifiers. For example, the consumer sharing circuitry 212 may provide a consumer sharing account notification (e.g., one or more emails) to consumer devices 108B-108N associated with Consumers Dan, Susan, Tom, and Joy based upon a set of e-mail addresses or other consumer identifiers provided to the consumer sharing circuitry 212 (e.g., based on e-mail addresses provided by a consumer who started the consumer sharing account). The consumer sharing account notification may invite each of Dan, Susan, Tom, and Joy to participate in the group buying experience by assigning one or more purchased promotions to a consumer sharing account. The consumer sharing account notification may include the consumer group identifier (e.g., "Tho's Honeypot"), a link to access the consumer sharing account, and an indication of the group sharing period (e.g., "5 Days to Buy Together Remaining"). Consumers Dan, Susan, Tom, and Joy may each click the link to access, via one or more consumer devices 108, the consumer sharing account. In some embodiments, consumer identifiers for addressing the consumer sharing account notification may be derived using social networking data. For example, the consumer sharing circuitry 212 may interface with a social networking service (e.g., a social networking website) via an application programming interface provided by the social networking service to obtain consumer identifiers associated with friends, colleagues, or the like of a particular consumer. These consumer identifiers may be employed to allow a consumer to select recipients of the consumer sharing account notification, such as by listing the friends of the consumer as defined by the social networking as potential recipients of the consumer sharing account notification.

The consumer sharing circuitry 212 may be configured to receive an indication of assignment of a consumer account to a consumer sharing account. For example, the server 104 may receive an indication provided by receiving consumer group data that indicates an assignment of each consumer account associated with Dan, Susan, Tom, and Joy to the consumer sharing account when each individual clicks, via consumer device 108B-108N, a link, button, or icon to access the consumer sharing account.

In some embodiments, the consumer sharing circuitry 212 may be further configured to provide an electronic user interface for interacting with the consumer sharing account to at least one consumer device associated with a plurality of consumer accounts, The user interface may configured to include a consumer group identifier, consumer sharing account notifications configured to provide one or more consumer messages, a digital progress indicator, and/or a contributors section.

The consumer sharing circuitry 212 may be further configured to provide an electronic user interface to a first consumer device 108A (e.g., a mobile device or wearable). In turn, the consumer sharing circuitry 212 may be configured to receive, from the first consumer device associated with the first consumer account of a plurality of consumer accounts, one or more consumer identifiers (e.g., one or more telephone numbers) associated with a particular second consumer device 108B-108N.

The consumer sharing circuitry 212 may be configured to send a consumer sharing account notification to a second consumer device based on one or more consumer identifiers. The consumer sharing account notification may include an invitation notifying the second consumer device of the consumer sharing account. For example, the consumer sharing circuitry 212 may send an electronic communication to a second consumer device 108B associated with the telephone number "999-999-9999."

In some embodiments, there may arise a need to remove a promotion and/or a transaction metric from a consumer sharing account. Therefore, the consumer sharing circuitry 212 may be configured to receive an indication of removal of a transaction metric. An indication of removal of a transaction metric from a consumer sharing account may be received by the server 104 when a consumer, for example, selects a button, selects from a drop-down menu, deletes an associated purchased promotion, or otherwise provides, via the consumer device 108, a request to remove a transaction metric associated with a purchased promotion. For example, the consumer sharing account 212 may receive an indication to remove a transaction metric "10" associated with Massage Promo A from a consumer sharing account upon a consumer selecting, via the consumer device 108, a "Remove" button to effectively remove the promotion from the consumer sharing account. In some embodiments, the consumer sharing account 212 may receive an indication to remove a consumer sharing account from a consumer account in response to a consumer selecting, for example, "Withdraw From Group" from a drop-down menu. Such an action may remove all contributions from the consumer to the particular consumer sharing account. Alternatively, in some embodiments the consumer may select a particular transaction metric for withdrawal, such that the individual transaction or transactions are removed, but the consumer remains associated with the consumer sharing account.

It should be appreciated that other example embodiments may provide for a re-assignment of a transaction metric to one or more consumer sharing accounts. As such, the consumer sharing circuitry 212 may be configured to associate the transaction metric to a second consumer sharing account. For example, the Massage Promo A associated with transaction metric "10" may be currently assigned to a first consumer sharing account in response to the consumer purchasing the Massage Promo A and electing to associate the transaction metric "10" for the purchase with the first consumer sharing account; however, the Massage Promo A may be re-assigned to a second consumer sharing account upon a consumer selecting, via a consumer device 108, an "Add" button associated with the second consumer sharing account and then selecting an interface control associated with the transaction metric "10".

The consumer sharing circuitry 212 may be configured to associate at least a portion of the consumer group reward to the at least one consumer account in response to the group progress count exceeding the group progress threshold. In some embodiments, each consumer associated with the consumer sharing account may receive the same reward. For example, the consumer sharing circuitry 212 may be configured to associate a $5 gift card to each consumer account associated with the consumer sharing account. Alternatively, in some embodiments rewards for a consumer sharing account may be assigned based upon relative contributions to the consumer sharing account. For example, if $100 in transaction metrics are allocated to the group, a first consumer provided $50 of the total, a second consumer provided $30 of the total, and a third consumer provided $20 of the total, and the group receives an aggregate reward of $10, then the reward might be divided as $5 to the first consumer, $3 to the second consumer, and $2 to the third consumer, reflecting each consumer's contributions to the group sharing account.

The consumer sharing circuitry 212 may receive the consumer group data via a network interface provided by the communications circuitry 208. Using the aforementioned example, the consumer sharing circuitry 212 may receive consumer group data which may indicate the number of group members (e.g., three group members), the group member maximum value (e.g., $50 of the total), and the group member minimum value (e.g., $20 of the total) to determine such reward contributions. The consumer sharing circuitry 212 may utilize processing circuitry, such as the processor 202, to perform these actions. However, it should also be appreciated that, in some embodiments, the consumer sharing circuitry 212 may include a separate processor, specially configured field programmable gate array (FPGA), or application specific interface circuit (ASIC) to perform the functions as described herein above. The consumer sharing circuitry 212 is therefore implemented using hardware components of the apparatus configured by either hardware or software for implementing these planned functions.

The group progression circuitry 214 includes hardware configured to determine a group progress count based on one or more transaction metrics. The group progression circuitry 214 may be configured to receive an indication of assignment of the transaction metric of at least one purchased promotion to a consumer sharing account.

The group progression circuitry 214 may be configured to determine whether the group progress count exceeds a group progress threshold. The group progress threshold may be pre-determined or dynamically generated. In some embodiments, a group progress threshold may be stored in database 106. The group progression circuitry 214 may compare the group progress count to the group progress threshold to determine whether the group progress count exceeds a group progress threshold.

The group progression circuitry 214 may be configured to utilize processing circuitry, such as the processor 202, to perform these actions. However, it should also be appreciated that, in some embodiments, the group progression circuitry 214 may include a separate processor, specially configured field programmable gate array (FPGA), or application specific interface circuit (ASIC) to determine a group progress count based on the transaction metric and to determine whether the group progress count exceeds a group progress threshold. The group progression circuitry 214 is therefore implemented using hardware components of the apparatus configured by either hardware or software for implementing these planned functions.

The group relevance circuitry 216 includes hardware configured to identify relevant promotions and/or consumer accounts to associate with a consumer sharing account. The group relevance circuitry 216 may be configured to determine one or more consumer accounts to associate with the consumer sharing account. In some embodiments, the group relevance circuitry 216 may leverage information provided by one or more consumer devices 108 to improve the relevancy of consumer suggestions provided to individual consumers or groups of consumers for inviting such suggested consumers to associate respective consumer accounts with a consumer sharing account. In this manner, the group relevance circuitry 216 may determine consumers, consumer accounts, and individuals that are more likely to associate with the consumer sharing account. The determination may be based on clickstream data, location data, consumer group data, group reward data, and other information provided by and/or relating to particular consumers.

The group relevance circuitry 216 may be configured to determine one or more promotions to associate with one or more consumer accounts associated with the consumer sharing account. The group relevance circuitry 216 may leverage information provided by the consumer device 108 to improve the relevancy of marketing communications to individual consumers or consumer groups. In this manner, the group relevance circuitry 216 may determine promotions, goods, and services that are more likely to be of interest to a particular consumer or group of consumers. The determination may be based on clickstream data, location data, consumer group data, group reward data, and other information provided by and/or relating to particular consumers.

The group relevance circuitry 216 may receive the consumer group data via a network interface provided by the communications circuitry 208. The group relevance circuitry 216 may utilize processing circuitry, such as the processor 202, to perform these actions. However, it should also be appreciated that, in some embodiments, the group relevance circuitry 216 may include a separate processor, specially configured field programmable gate array (FPGA), or application specific interface circuit (ASIC) to determine one or more consumer accounts and/or one or more promotions to associate with the consumer sharing account, indicate one or more consumers, and/or indicate the one or more promotions. The group relevance circuitry 216 is therefore implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of apparatus 200A. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Figure 2B:
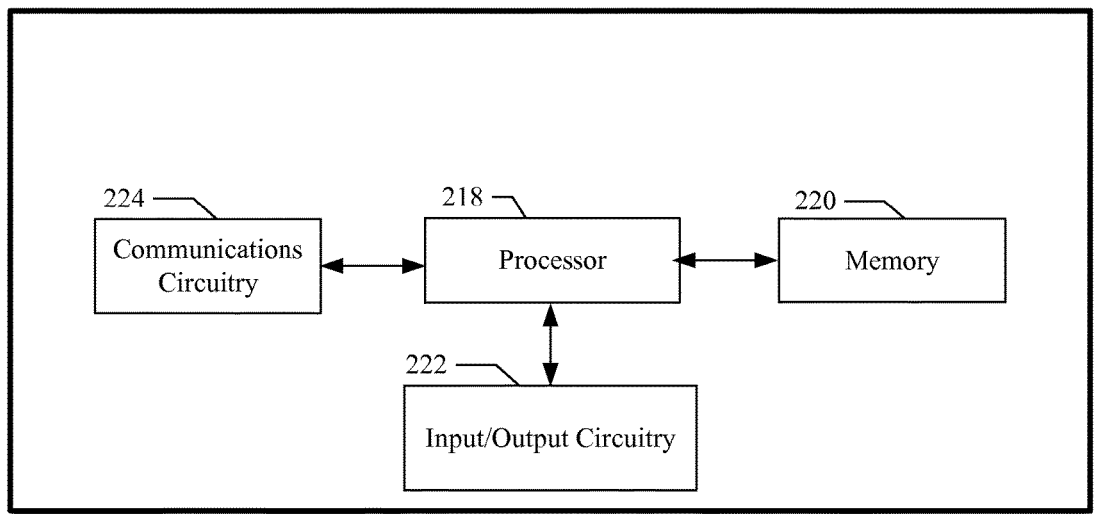
FIG. 2b illustrates a block diagram showing an example consumer device for implementing a consumer sharing account using special-purpose circuitry in accordance with some example embodiments of the present invention.

The consumer device(s) 108 may be embodied by one or more computing systems, such as apparatus 200B shown in FIG. 2b. As illustrated in FIG. 2b, the apparatus 200B may include a processor 218, a memory 220, an input/output circuitry 222, and communications circuitry 224. The apparatus 200B may be configured to execute the operations described below with respect to FIGS. 1 and 3-10. The functioning of the processor 218, the memory 220, the input/output circuitry 222, and the communication circuitry 224 may be similar to the similarly named components described above with respect to FIG. 2a. For the sake of brevity, additional description of these components is omitted.

Example Electronic Marketing Information Service Data Flow

Figure 3:
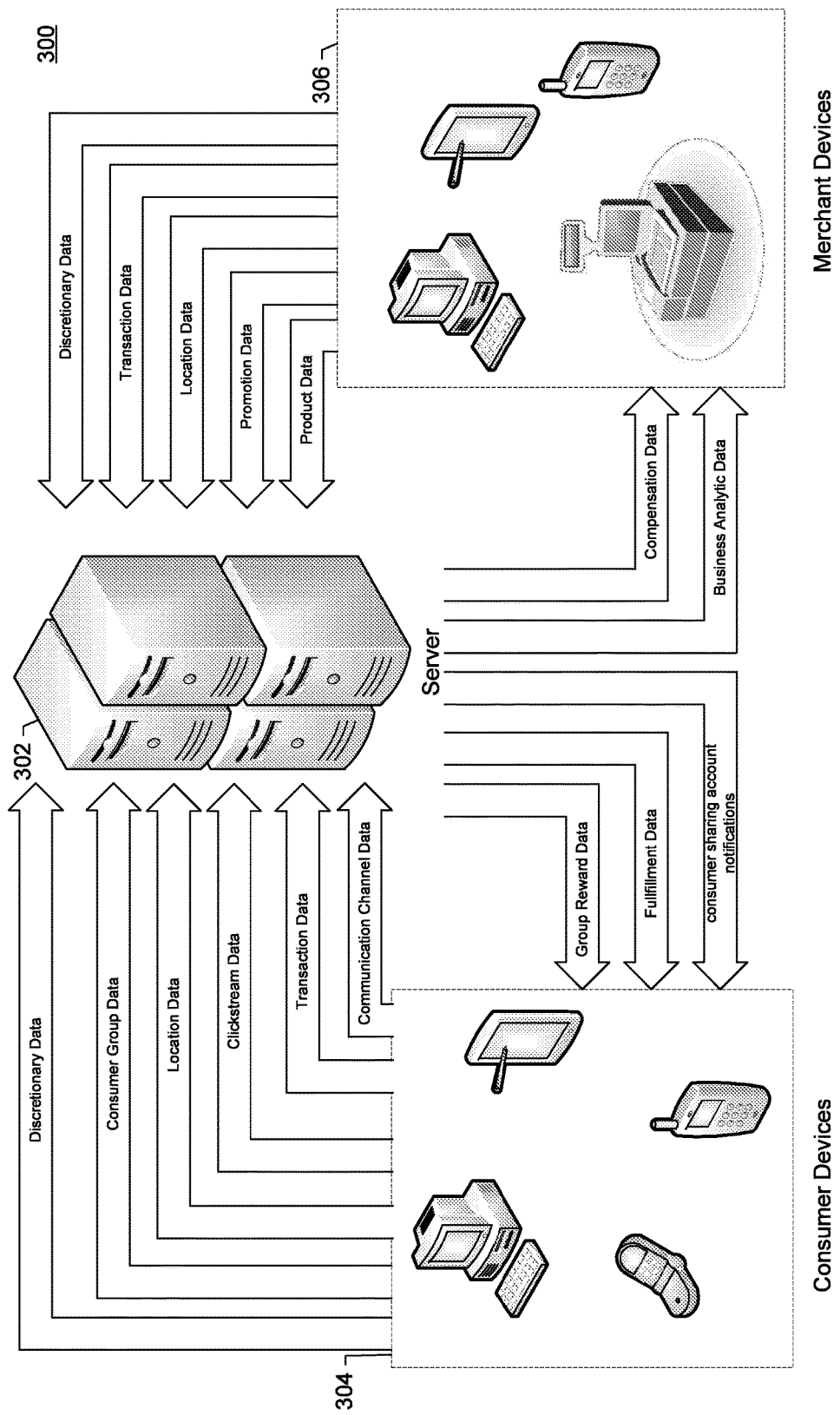
FIG. 3 illustrates an example data flow among a consumer device, a server, and a merchant device in accordance with some example embodiments of the present invention.

FIG. 3 depicts an example data flow 300 illustrating interactions between a server 302, one or more consumer devices 304, and one or more merchant devices 306. The server 302 may be implemented in the same or a similar fashion as the server 104 as described above with respect to FIG. 1, the one or more consumer devices 304 may be implemented in the same or a similar fashion as the consumer devices 108A-108N as described above with respect to FIG. 1, and the one or more merchant devices 306 may be implemented in the same or a similar fashion as the merchant devices 110A-110N as described above with respect to FIG. 1.

The data flow 300 illustrates how electronic information may be passed among various systems when employing a server 302 in accordance with embodiments of the present invention. The one or more consumer devices 304 and/or one or more merchant devices 306 may provide a variety of electronic marketing information to the server 302 for use in providing promotion and marketing services to the consumer. This electronic marketing information may include, but is not limited to, location data, clickstream data, transaction data, communication channel data, consumer group data, group reward data, and/or discretionary data.

As a result of transactions performed between the one or more consumer devices 304 and the server 302, the server 302 may provide fulfillment data to the consumer devices. The fulfillment data may include information indicating whether the transaction was successful, the location and time the product will be provided to the consumer, instruments for redeeming promotions purchased by the consumer, or the like.

In addition to the e-commerce interactions with the one or more consumer devices 304 offered by the server 302, the server 302 may leverage information provided by the consumer devices to improve the relevancy of marketing communications to individual consumers or groups of consumers. In this manner, the server 302 may determine promotions, goods, and services that are more likely to be of interest to a particular consumer or group of consumers based on clickstream data, location data, consumer group data, group reward data, and other information provided by and/or relating to particular consumers. For example, the server 302 may detect the location of a consumer based on location data provided by the consumer device, and offer promotions based on the proximity of the consumer to the merchant associated with those promotions.

Alternatively, the server 302 may note that the consumer has an interest in a particular hobby (e.g., skiing) based on electronic marketing information associated with the consumer (e.g., a browser cookie that indicates they frequently visit websites that provide snowfall forecasts for particular ski resorts), and offer promotions associated with that hobby (e.g., a promotion offering discounted ski equipment rentals or lift tickets). It should be appreciated that a variety of different types of electronic marketing information could be provided to the server 302 for the purpose of improving the relevancy of marketing communications. It should also be appreciated that this electronic marketing information may be received from a variety of electronic sources, including various consumer devices, merchant devices, and other sources both internal and external to a promotion and marketing service. For example, other data sources may include imported contact databases maintained by merchants, electronic survey questions answered by consumers, and/or various other forms of electronic data.

It should also be appreciated that the server 302 may also control other factors of the consumer sharing account notifications sent to the consumer other than the particular promotions included in the consumer sharing account notification. For example, the server 302 may determine the form, structure, frequency, and type of the consumer sharing account notification. As with the content of the consumer sharing account notification, these factors may be programmatically determined according to various methods, factors, and processes based on electronic data received by the server 302 for the purpose of maximize the likelihood that the communication will be relevant to the recipient consumer.

The server 302 interactions with the one or more merchant devices 306 may be related to enabling the merchant to market their products using a promotion and marketing service. For example, the one or more merchant devices 306 may provide promotion data defining one or more promotions to be offered by the promotion and marketing service on behalf of the merchant. The server 302 may receive this information and generate information for providing such promotions via an e-commerce interface, making the promotions available for purchase by consumers. The server 302 may also receive information about products from the one or more merchant devices 306. For example, a merchant may provide electronic marketing information indicating particular products, product prices, inventory levels, and the like to be marketed via a promotion and marketing service.

The server 302 may receive this information and generate listing information to offer the indicating products to consumers via a promotion and marketing service.

The one or more merchant devices 306 may also receive information from the server 302. For example, in some embodiments a merchant may obtain access to certain business analytic data aggregated, generated, or maintained by the server 302. As a particular example, a merchant might offer to pay for consumer demographic data related to products or services offered by the merchant. It should be appreciated however, that a merchant may not need to list any products or services via the promotion and marketing service in order to obtain such data. For example, the promotion and marketing service may enable merchants to access electronic marketing data offered via the promotion and marketing service based on a subscription model. The one or more merchant devices 306 may also receive electronic compensation data from the server 302. For example, when a promotion or product is sold by the promotion and marketing service on behalf of the merchant, a portion of the received funds may be transmitted to the merchant. The compensation data may include information sufficient to notify the merchant that such funds are being or have been transmitted. In some embodiments, the compensation data may take the form of an electronic wire transfer directly to a merchant account. In some other embodiments, the compensation data may indicate that a promotion or product has been purchased, but the actual transfer of funds may occur at a later time. For example, in some embodiments, compensation data indicating the sale of a promotion may be provided immediately, but funds may not be transferred to the merchant until the promotion is redeemed by the consumer.

Embodiments advantageously provide for improvements to the server 302 by improving the consumer sharing account notifications provided by the server 302 to the consumer device 304 by providing for improved consumer relevance for inclusion in such consumer sharing account notifications. Such embodiments improve the operations and method for determining particular consumers to invite to participate in the group buying experience. In particular, embodiments provide improved techniques for evaluating clickstream data, location data, consumer group data, group reward data, and other information provided by and/or relating to particular consumers. Additionally, various aggregation, filtering, and sorting techniques are used to determine the most relevant consumers and/or consumer accounts to select for inclusion in such consumer sharing account notifications and to transmit the consumer sharing account notifications to the consumer device 304.

Further improvements to server 302 provide for improved promotion relevance for inclusion in consumer sharing account notifications by improving the consumer sharing account notifications provided by the server 302 to the consumer device 304. Such embodiments improve the operations and methods for determining particular to promotions to offer consumers who are recipients of an electronic communication inviting the consumer to participate in a group buy experience or consumers who are associated with a consumer sharing account. In particular, embodiments provide improved techniques for evaluating clickstream data, location data, consumer group data, group reward data, and other information provided by and/or relating to particular promotions and/or consumers. Again, various aggregation, filtering, and sorting techniques as described above are used to determine the most relevant promotions to select for inclusion in such consumer sharing account notifications and to transmit the consumer sharing account notifications to the consumer device 304.

Furthermore, improvements to the server 302 include providing improved consumer sharing account notifications which include consumer sharing account notifications to the consumer device 304. Such consumer sharing account notifications provide improved techniques for evaluating clickstream data, location data, consumer group data, group reward data, and other information provided by and/or relating to consumer sharing accounts as described above.

As such, improvements described herein serve to improve the group buying experience provided by the server 302 by identifying consumers likely to participate in the group buying experience. Moreover, such improvements to server 302 serve to identify promotions of interest to particular consumers; thereby, enhancing sales and the ability of the consumer group to receive consumer group rewards provided by the server 302.

Example Group Buying Via Promotion and Marketing Service

Figure 4:
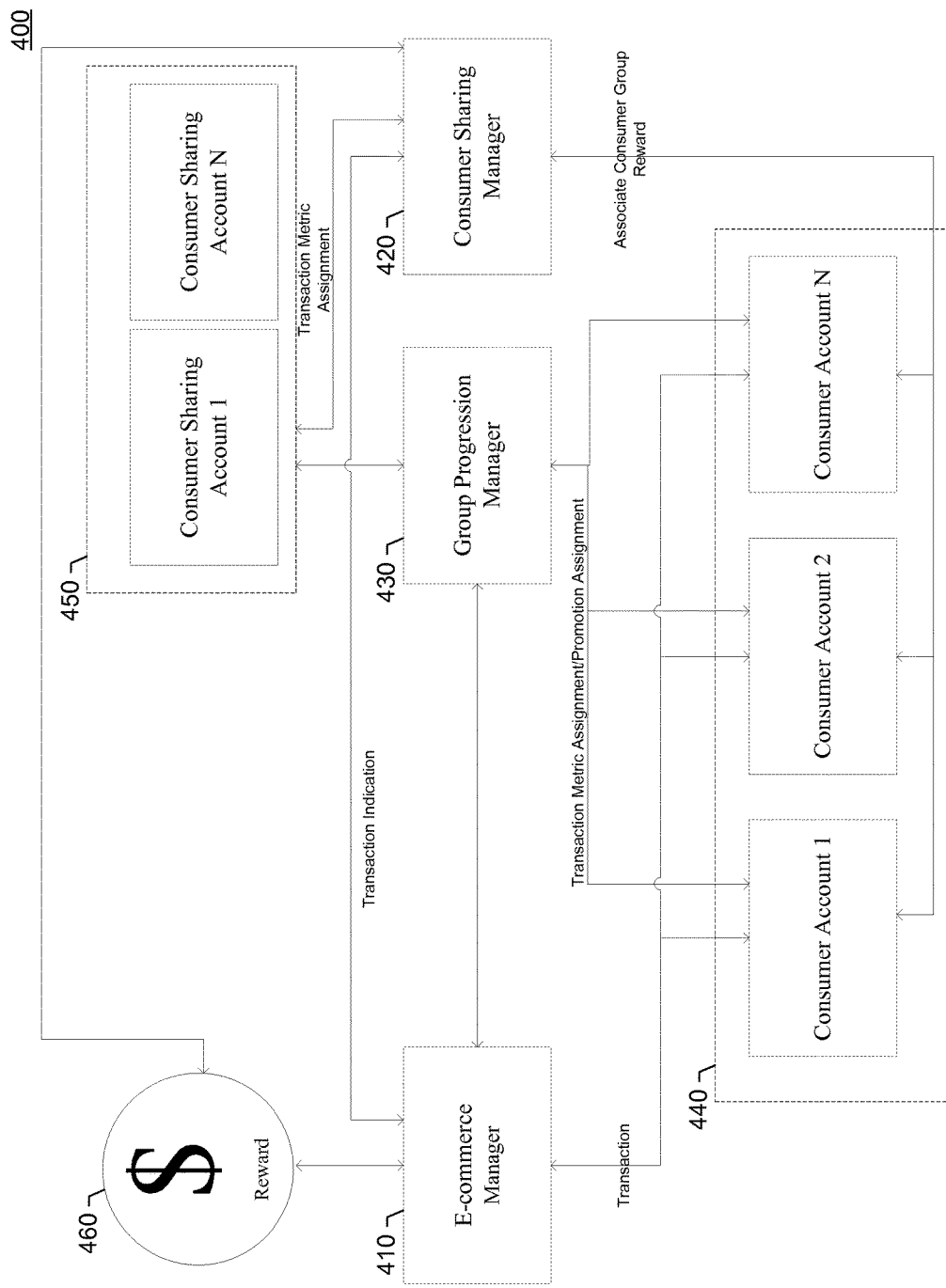
FIG. 4 illustrates an example data flow interaction between elements of an example device for implementing a consumer sharing account in accordance with some example embodiments of the present invention.

FIG. 4 illustrates an example data flow interaction between a consumer sharing manager 420 which is associated with the consumer sharing circuitry 212 and components of a promotion and marketing service 102 in accordance with some example embodiments of the present invention. The consumer sharing manager 420 may communicate with other components of a promotion and marketing service 102 to provide a consumer group reward 460 to a consumer account 440 associated with a consumer group. In the present example, the e-commerce manager 410 associated with the e-commerce circuitry 210 may manage the purchase of a promotion by receiving, via a consumer account 440, transaction data from a consumer device 304 when a consumer performs a transaction, such as purchasing a promotion, with the promotion and marketing service 102. The transaction data generated from the transaction may be stored via the e-commerce manager 410 in memory, such as the memory 204 as described above. The e-commerce manager 410 may query database 106 to determine at least one purchased promotion of a consumer account.

In turn or additionally, the consumer sharing manager 420 may be operable to associate a transaction metric derived from at least one purchased promotion to a consumer sharing account 450 (e.g. a honeypot) in response to a consumer assigning a purchased promotion to consumer sharing account 450. In some examples, the consumer sharing manager 420 may interact with the database 106, memory 204, and/or consumer devices 108 to receive the transaction metric.

In other embodiments, the consumer sharing manager 420 may be configured to determine whether the at least one purchased promotion qualifies for association with the consumer sharing account 450. Such determination may be based on the promotion order date. In some example embodiments, a purchased promotion may qualify for association to the consumer sharing account 450 provided that the promotions are purchased within a group sharing period.

The consumer sharing manager 420 may be operable to invite other consumers to participate in the group buying experience. As such, the consumer sharing circuitry manager 420 may be configured to receive one or more consumer identifiers via the consumer device 304, database 106, third party website, and/or application interface. For example, the consumer sharing manager 420 may receive a consumer identifier (e.g., one or more telephone numbers) provided by a consumer device 304. Each consumer identifier may be associated with a corresponding consumer account, social media account, email account, mobile account, or cloud computing account.

When a consumer receives, via consumer device 304, a consumer sharing account notification, the consumer sharing account notification may invite the consumer to participate in a group buying experience by assigning one or more purchased promotions to a consumer sharing account 450. The consumer sharing manager 420 may receive an indication of consumer's interest in participating in the group buying experience when the consumer, for example, clicks the link to access, via one or more consumer devices 108, the consumer sharing account 450.

In some embodiments, consumer identifiers for addressing the consumer sharing account notification may be derived using social networking data. The consumer sharing manager 420 may receive social networking data provided by a social networking service (e.g., a social networking website) via an application programming interface provided by the social networking service to obtain consumer identifiers associated with friends, colleagues, or the like of a particular consumer. Such consumer identifiers may be used by the consumer sharing manager 420 to invite friends, colleagues, or the like of a particular consumer to participate in the group buying experience.

The promotion and marketing service 102 may provide flexibility for a consumer who may need to remove a promotion from a consumer sharing account 450. In such example embodiments, the consumer sharing manager 420 may be configured to disassociate a transaction metric from the consumer sharing account 450 in response to the consumer sharing manager 420 receiving an indication of removal of a transaction metric. An indication of removal of a transaction metric from a consumer sharing account may be received by the consumer sharing manager 420 when a consumer, for example, selects a button via the consumer device 304 to remove a transaction metric associated with a purchased promotion.

Having become interested in another consumer sharing account, a consumer may re-assign a purchased promotion via the promotion and marketing service 102 to a second consumer sharing account 450. As such, the consumer sharing manager 420 may be configured to associate the transaction metric to a second consumer sharing account.

The group progression manager 430 which may be associated with the group progression circuitry 214 may monitor the group progress count. As the consumer sharing manager 420 associates one or more transaction metrics to the consumer sharing account 450 or removes one or more transaction metrics from the consumer sharing account 450, the group progression manager 430 may interact with the consumer sharing manager 420 to determine a group progress count based on the transaction metric. The group progression manager 430 may interact with the database 106 and/or the memory 204 to receive a group progress count. In further embodiments, the group progression manager 430 may interact with the database 106 and/or the memory 204 to determine a group progress threshold. In some example embodiments, the group progression manager 430 may determine whether the group progress count exceeds a group progress threshold.

Consumers in the group may be rewarded based on cumulative contributions of transaction metrics (e.g., the total amount spent) as group progress thresholds are exceeded during a group sharing period. Such transaction metrics contributed to a particular consumer sharing account 450 may be removed from the consumer sharing account 450 or re-assigned to another consumer sharing account 450 until the group sharing period expires and/or until the consumer sharing account provides a consumer group reward. 460

After the consumer group exceeds the group progress threshold by assigning purchased promotions to the consumer sharing account, a consumer group reward 460 may be provided to each consumer account 440 associated with the consumer sharing account 450. The consumer sharing manager 420 may associate at least a portion of the consumer group reward 460 to at least one consumer account 440 in response to the group progress count exceeding the group progress threshold. Alternatively, in some embodiments consumer group rewards 460 may be associated to a consumer account 440 based upon relative contributions provided per consumer account 440 to the consumer sharing account 450. FIGS. 5-10 further describe example embodiments of operations and processes for providing group rewards.

Example Process for Providing Consumer Group Rewards

Figure 5:
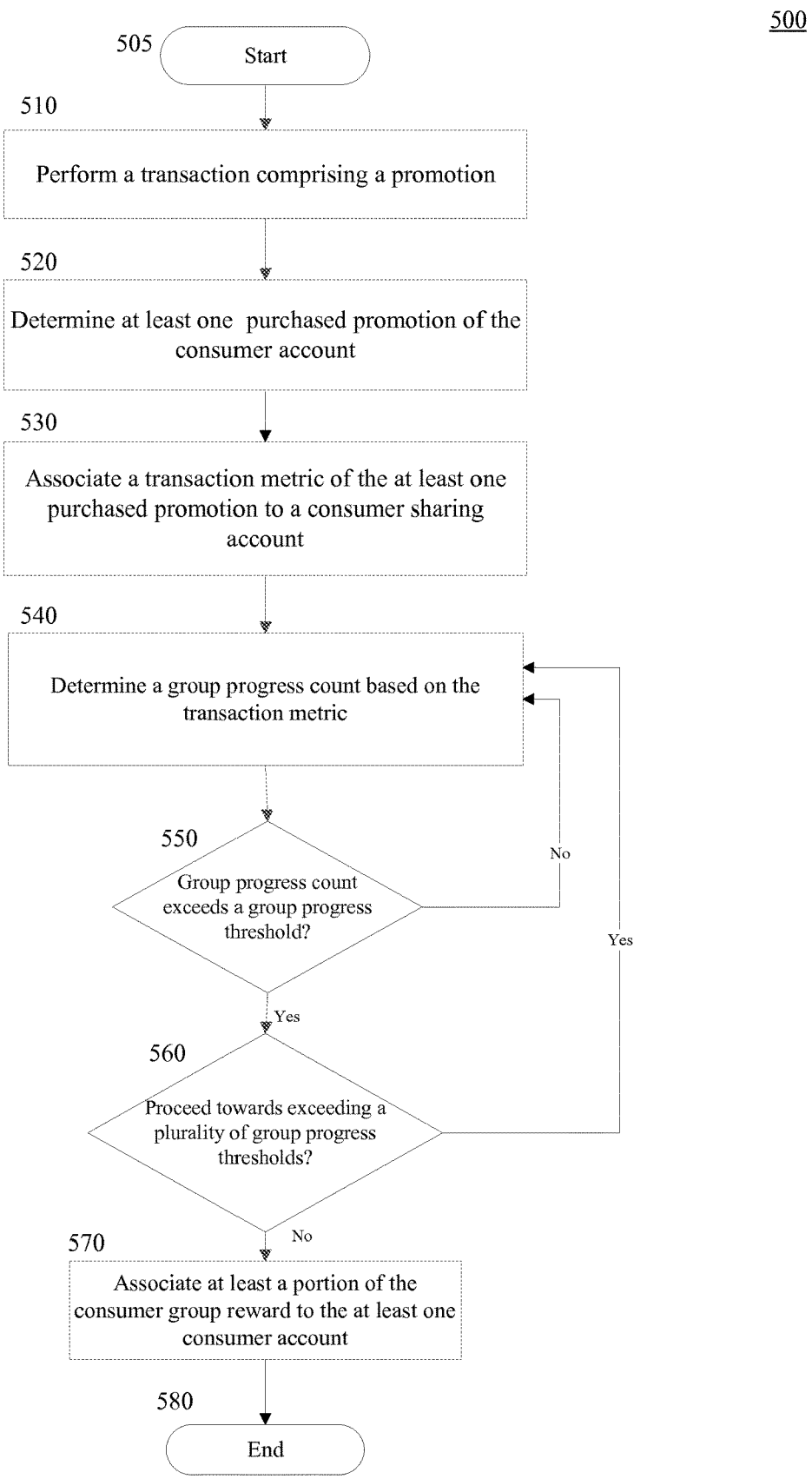
FIG. 5 illustrates a flowchart describing an exemplary process for providing consumer group rewards in accordance with some example embodiments discussed herein.

Turning now to FIG. 5, example operations for providing consumer group rewards are illustrated from the perspective of a promotion and marketing service that incorporates a consumer sharing manager. Providing a platform to receive consumer group rewards incentivizes consumers to purchase promotions which positively impacts the volume of promotions purchased. The operations illustrated in FIG. 5 may, for example, be performed by elements of the promotion and marketing service 102 (e.g., the server 104) described with respect to FIG. 1, with the assistance of, and/or under the control of one or more devices, such as apparatus 200A and/or 200B. In particular, embodiments of a process 500 may be performed by e-commerce circuitry 210, consumer sharing circuitry 212, and group progression circuitry 214 as described above with respect to FIGS. 2a and 2b. Such circuitry may provide means for performing the various actions described with respect to the process 500.

Flow diagram 500 may begin at action 505 and proceed to action 510, where the server 104 may be configured to perform, via e-commerce circuitry 210, a transaction comprising a promotion. In some embodiments, the server 104 may be configured to receive transaction data from one or more consumer devices 304 upon a consumer purchasing a promotion. For example, the server 104 may receive information relating to the transaction, such as consumer billing information for the purchase of Sushi Promo A.

As shown in block 520 of FIG. 5, the system 102, may include means, such as the server 104 for determining at least one purchased promotion of the consumer account. For example, a consumer account may include two promotions, such as Sushi Promo A which has been purchased and Pizza Promo B which has not been purchased. The system 102 may determine Sushi Promo A has been purchased when transaction data is received and an order confirmation number is generated for Sushi Promo A.

Upon a consumer purchasing and/or accepting a promotion, an impression may then be generated based on the promotion data and/or provided to consumer device 304. In some embodiments, a consumer device 304 may receive an impression in the form of an offer to associate at least one purchased promotion to a consumer sharing account. For example, upon purchasing a promotion, a consumer may receive, via the consumer device 304, an offer to receive a consumer group reward, for example, a 5% refund associated with a consumer sharing account.

In some embodiments, the server 104 may determine whether at least one purchased promotion qualifies for association with a consumer sharing account. In some example embodiments, the determination may be based on the promotion order date. For example, Sushi Promo A may qualify for association with a consumer sharing account provided Consumer X requests to associate Sushi Promo A to the consumer sharing account within three days of Sushi Promo A's promotion order date.

The server 104 may be configured to provide a consumer sharing account notification of the consumer sharing account to at least one consumer device 304 associated with at least one consumer account. In some embodiments, the consumer sharing account notification may include a consumer group identifier, a link, and a group sharing period. For example, Consumer X may receive a consumer sharing account notification (e.g., an email) inviting Consumer X to assign one or more promotions to a consumer sharing account. The consumer sharing account notification may include the consumer group identifier (e.g., a name or description for the group) "Tho's Honeypot," a link to access the consumer sharing account, and the group sharing period "7 Days to Buy Together." Consumer X may click the link to access, via the consumer device 304, the consumer sharing account.

As shown in block 530 of FIG. 5, the promotional system 102, may include means, such as the server 104 for associating a transaction metric of at least one purchased promotion to a consumer sharing account. A transaction metric may include, for example, the monetary value paid for the promotion. The transaction metric may be associated to the consumer sharing account via a link, an icon, a button, and/or the like. For example, a transaction metric may include the monetary value, $33, paid by Consumer X for Sushi Promo A. The server 104 may associate $33 to the consumer sharing account in response to Consumer X clicking an "add promotion" icon.

The system 100 may receive an indication of an assignment of a transaction metric to the consumer sharing account. In some embodiments, the server 104 may generate a consumer sharing account notification which may include a consumer group identifier and a button to assign a transaction metric associated with a purchased promotion to a consumer sharing account. For example, a consumer sharing account notification may include the consumer group identifier "Tho's Honeypot" and an "add order" button. The transaction metric may be associated to the consumer sharing account in response to the selection of the "add order" button.

The server 104 may generate a user interface which may include a web user interface, a mobile application, and/or the like in response to Consumer X clicking the "add order" button. The user interface may include one or more purchased promotions associated with a transaction metric which may be associated with a consumer sharing account. For example, the user interface may include Sushi Promo A, Kayaking Promo B, and Getaway Promo C and corresponding "Add" buttons. Consumer X may click the "Add" button corresponding to Sushi Promo A to associate the transaction metric (e.g., $33) with the consumer sharing account.

Flow diagram 500 may proceed to action 540, where the server 104 may be configured to determine a group progress count based on the transaction metric. The group progress count may refer to an accumulation of a transaction metric (e.g., a monetary value). The group progress count may represent a status of the consumer sharing account in relation to exceeding a group progress threshold. The server 104 may monitor the group progress count. In some exemplary embodiments, the server 104 may update the group progress count as a transaction metric is associated with a consumer sharing account. For example, the server 104 may increase the group progress count to $33 when the transaction metric $33 associated with Sushi Promo A is associated with the consumer sharing account.

In other embodiments, the server 104 may determine whether the group progress count exceeds a group progress threshold. A pre-determined, or dynamically generated, group progress threshold may be stored in database 106. The server 104 may compare the group progress count to the group progress threshold. As the server 104 monitors the group progress count, the server 104 may determine the group progress count exceeds the group progress threshold. For example, the server 104 may determine the group progress count is "$80." The server 104 may compare the group progress count "$80" to the group progress threshold "$75" and determine that the group progress exceeds the group progress threshold.

In an alternate or additional example embodiment, the group progress threshold may be "$75." The server 104 may compare the group progress count "$33" to the group progress threshold "$75" and determine that the group progress count does not exceed the group progress threshold. At which point the group progress count does not exceed the group progress threshold, the server 104 may continue monitoring the group progress count by determining the group progress count based on the transaction metric 540.

In some embodiments, the server 104 may determine whether the consumer group may proceed towards exceeding a plurality of group progress thresholds. The server 104 may provide a user interface to the consumer device 304 and/or receive consumer group data from the consumer device 304. For example, upon exceeding a first group progress threshold "$75," the server 104 may provide a user interface that includes an electronic voting option to the consumer device 304. Upon receiving a vote from each consumer account associated with the consumer sharing account, the server 104 may determine the consumer group will proceed towards exceeding a second group progress threshold "$125."

In the alternative, the server 104 may determine the consumer group will not proceed towards exceeding a second group progress threshold at which point, the server 104 may proceed to block 570.

Upon determining a group progress count exceeds a group progress threshold, flow diagram 500 may proceed to block 570. As shown in block 570, system 102 may include means, such as the server 104 which may be configured to associate at least a portion of the consumer group reward to at least one consumer account. For example, a consumer group reward (e.g., a 5% refund) may be associated to one consumer account (e.g., the consumer account of Consumer X).

In other example embodiments, the server 104 may be configured to associate at least a portion of the consumer group reward to a plurality of consumer accounts. For example, a consumer sharing account may be associated to Consumer Account 1, Consumer Account 2, Consumer Account 3, and Consumer Account 4. The server 104 may be configured to associate the 5% refund, in full or in part, to each consumer account (e.g., Consumer Account 1, Consumer Account 2, Consumer Account 3, and Consumer Account 4) associated to the consumer sharing account.

Example Process for Expanding the Group Buying Experience

Figure 6:
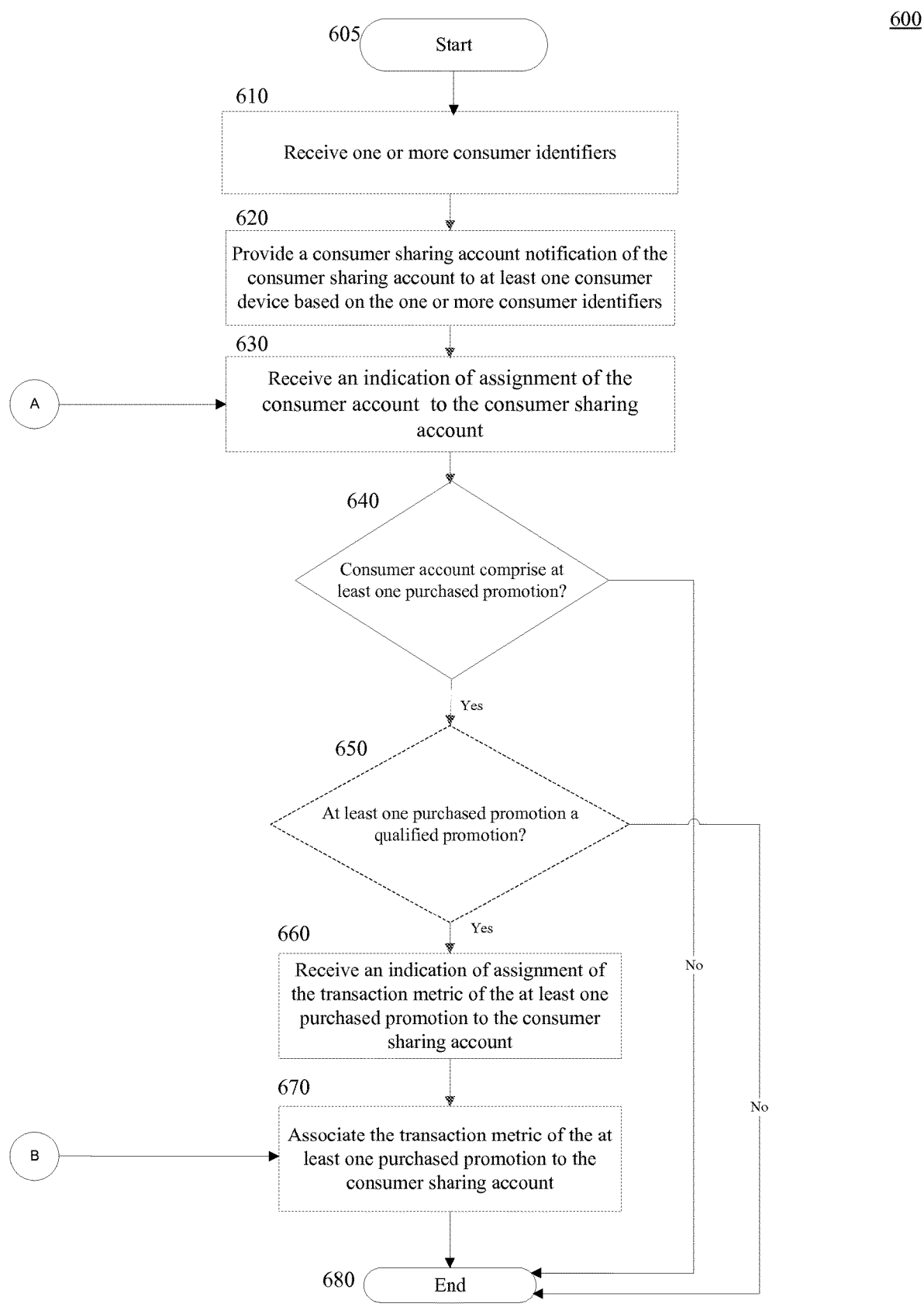
FIG. 6 illustrates a flowchart showing an exemplary process for expanding the group buying experience in accordance with some example embodiments discussed herein.

FIG. 6 illustrates example operations for expanding a group buying experience among a consumer group from the perspective of a promotion and marketing service that incorporates a consumer sharing manager. Providing the ability of the consumer group to expand the number of participating consumers and the various types of promotions that may be associated with a consumer sharing account increases the pool of consumers who may be interested in participating in the group buying experience. The operations illustrated in FIG. 6 may, for example, be performed by elements of the promotion and marketing service 102 (e.g., the server 104) described with respect to FIG. 1, with the assistance of, and/or under the control of one or more devices, such as the apparatus 200A and/or 200B. In particular, embodiments of a process 600 may be performed by consumer sharing circuitry 212 and group progression circuitry 214 as described above with respect to FIGS. 2a and 2b. Such circuitry may provide means for performing the various actions described with respect to the process 600.

Flow diagram 600 may begin at action 605 and proceed to action 610, where the server 104 may be configured to receive one or more consumer identifiers. In some embodiments, the server 104 may receive one or more consumer identifiers via, for example, consumer device 304 or database 106. For example embodiments described herein, see FIGS. 2a and 7.

Flow diagram 600 may proceed to action 620, where the server 104 may be configured to provide a consumer sharing account notification of a consumer sharing account to at least one consumer device 304, or consumer account, based on one or more consumer identifiers. In some embodiments, the consumer sharing account notification may include a consumer group identifier, a link, and a group sharing period.

As shown in block 630, the server 104 may be configured to receive an indication of assignment of the consumer account to the consumer sharing account. For example, the server 104 may receive an indication of assignment of each consumer account associated with Dan, Susan, Tom, and Joy to the consumer sharing account when each individual clicks a link, button, or icon to access the consumer sharing account.

In other embodiments, the server 104 may receive an indication of assignment of a consumer account to the consumer sharing account. An indication of assignment of a consumer account to the consumer sharing account may be received by the server 104 when each consumer clicks a button to assign a transaction metric associated with a purchased promotion to a consumer sharing account. For example, a consumer sharing account notification may include the consumer group identifier "Tho's Honeypot," a button "add order," and a group sharing period "3 Days to Buy Together." When Dan, Susan, Tom, or Joy clicks the "add order" button, the server 104 may receive an indication of assignment of each corresponding consumer account to the consumer sharing account.

As shown at 640 of FIG. 6, the system 102 may include means, such as the server 104 for determining at least one purchased promotion of a plurality of consumer accounts as a consumer sharing account may be associated to a plurality of consumer accounts. The server 104 may determine Consumer Account 1 associated with Dan and Consumer Account 2 associated with Susan each may include a purchased promotion. The system 102 may determine Consumer Account 1 includes a purchased promotion from transaction data (e.g., an order confirmation code) stored in database 106 upon the server 104 evaluating such transaction data.

However, in other embodiments, the server 104 may determine, Consumer Account 3 associated with Tom does not include a purchased promotion. Upon determining a consumer account does not include a purchased promotion, flow diagram 600 ends at action 680.

In some embodiments, the server 104 may determine at action 650 whether at least one purchased promotion qualifies for association with a consumer sharing account. In some example embodiments, the determination may be based on monetary value of the promotion. For example, Bowling Promo A may qualify for association with a consumer sharing account provided Bowling Promo A has a monetary value greater than $25.

In other embodiments, the determination may be based on the purchase order date, the purchase expiration date, the group sharing period, or the like. For example, a purchased promotion that includes an expiration date within 10 days of the requests to associate the promotion to the consumer sharing account may not be determined as a promotion that qualifies for association to a consumer sharing account.

Figure 10:
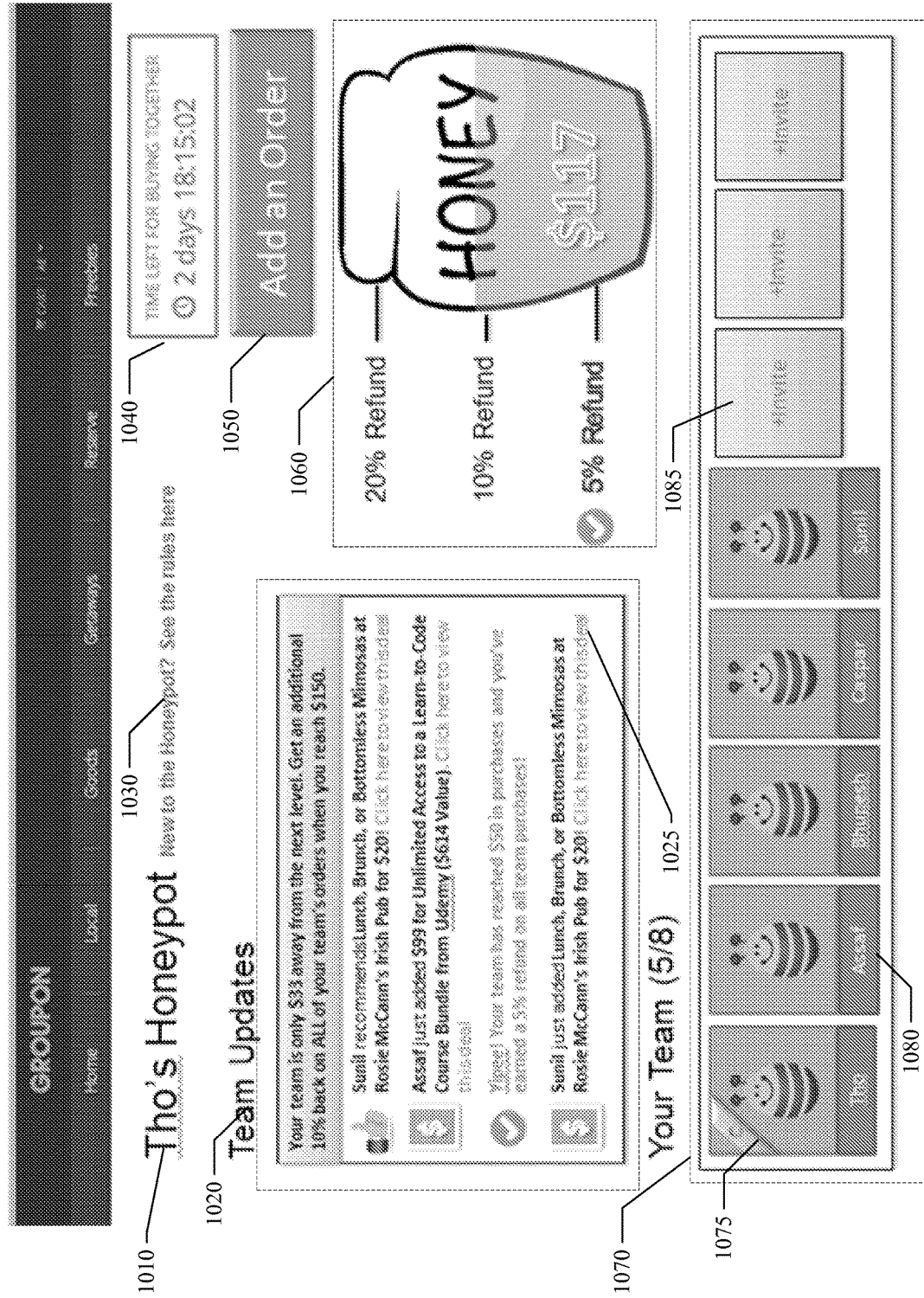
FIG. 10 illustrates an example graphical user interface for providing consumer sharing accounts that may be presented by various components of systems in accordance with some example embodiments discussed herein.

As shown in FIG. 10 (described herein below), the server 104 may be configured to provide a user interface for interacting with the consumer sharing account to at least one consumer device associated with a plurality of consumer accounts. The user interface may include a consumer group identifier, a message feed configured to provide at least one or more consumer messages, consumer sharing account status updates, a digital progress indicator, and a contributors section.

As shown in block 660, system 100 may receive an indication of an assignment of a transaction metric to the consumer sharing account. The functioning of receiving an indication of an assignment of a transaction metric to the consumer sharing account may be similar to that described above with respect providing consumer group rewards. For the sake of brevity, additional description of action 660 is omitted.

As shown in block 670 of FIG. 6, the system 110, may include means, such as the server 104 for associating a transaction metric of at least one purchased promotion to a consumer sharing account. The functioning of associating a transaction metric of at least one purchased promotion to a consumer sharing account may be similar to that described above with respect to block 530 of FIG. 5. For the sake of brevity, additional description of block 670 is omitted.

Example Process for Expanding the Group Buying Experience Via Consumer Devices Turning now to FIG. 7, example operations for expanding the group buying experience via consumer devices are illustrated from the perspective of a promotion and marketing service that incorporates a consumer sharing manager. In this example embodiment, consumers are provided with the ability to send a consumer sharing account notification from his or her consumer device 304 (e.g. mobile device) to the consumer device 304 of other consumers. This provides the ability to for consumer to send and/or receive rapid invitations to participate in the group buying experience. The operations illustrated in FIG. 7 may, for example, be performed by elements of the promotion and marketing service 102 (e.g., the server 104) described with respect to FIG. 1, with the assistance of, and/or under the control of one or more devices, such as apparatus 200A and/or 200B. In particular, embodiments of a process 700 may be performed by consumer sharing circuitry 212 and group progression circuitry 214 as described above with respect to FIGS. 2a and 2b. Such circuitry may provide means for performing the various actions described with respect to the process 700.

Flow diagram 700 may begin at action 710, where the server 104 may be configured to receive, from the first consumer device associated with the first consumer account of the plurality of consumer accounts, the one or more consumer identifiers of a second consumer device 304. For example, the server 104 may receive from a first consumer device 304 one or more consumer identifiers (e.g., a telephone number, mobile messaging identifier) such as "999-999-9999" or "jan@mobilemessaging" associated with a second consumer device 304.

In other embodiments, a consumer identifier may be associated with a social networking account, email account, mobile account, or cloud computing account. For example, a consumer identifier may be username "Bargain_Shopper_01" associated with a social networking account such as "MyFace.com."

As shown in block 720, the server 104 may be configured to send a consumer sharing account notification of the consumer sharing account to the second consumer device based on the one or more consumer identifiers. For example, the server 104 may send an electronic communication to a second consumer device 304 associated with the telephone number "999-999-9999". In other embodiments, a consumer sharing account notification may be sent, via the server 104, to a second consumer device 304 associated with mobile messaging identifier jan@mobilemessaging.

At point "A" of FIG. 7, the server 104 may resume the functions of point "A" of FIG. 6 as described herein. For the sake of brevity, additional description of point "A" is omitted.

Example Process for Providing Flexible Consumer Sharing

Figure 8:
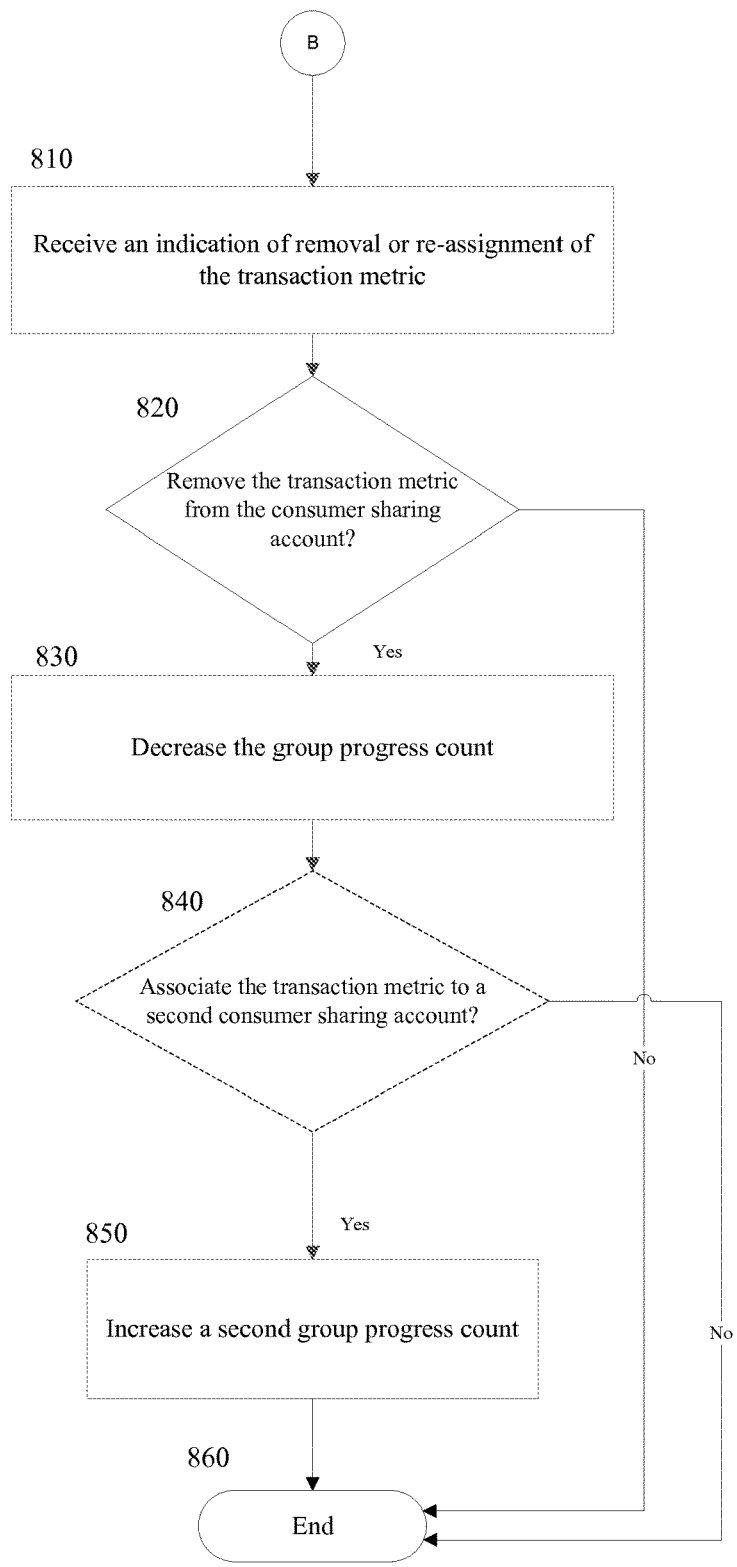
FIG. 8 illustrates a flowchart showing an exemplary process for providing flexible consumer sharing in accordance with some example embodiments discussed herein.

FIG. 8 illustrates example operations for providing flexible consumer sharing from the perspective of a promotion and marketing service that incorporates a consumer sharing manager. Providing flexible consumer sharing enhances a group buying experience. The consumers receive the benefit of participating in one or more group buying experiences according to their interest level in various consumer sharing accounts. The operations illustrated in FIG. 8 may, for example, be performed by elements of the promotion and marketing service 102 (e.g., the server 104) described with respect to FIG. 1, with the assistance of, and/or under the control of one or more devices, such as the apparatus 200A and/or 200B. In particular, embodiments of a process 800 may be performed by consumer sharing circuitry 212 and group progression circuitry 214 as described above with respect to FIGS. 2a and 2b. Such circuitry may provide means for performing the various actions described with respect to the process 800.

Flow diagram 800 may begin at point "B" as referenced in FIG. 6 as described herein. For the sake of brevity, additional description of point "B" is omitted.

Flow diagram 800 may proceed to block 810, where the server 104 may be configured to receive an indication of removal of a transaction metric. An indication of removal of a transaction metric from a consumer sharing account may be received by the server 104 when a consumer, for example, clicks a button, selects from a drop-down menu, deletes an associated purchased promotion, or otherwise provides a request to remove a transaction metric associated with a purchased promotion to the server 104.

The server 104 may generate a user interface which may include a web user interface, a mobile application, and/or the like in response to Consumer Y accessing the consumer sharing account. The user interface may include one or more promotions associated with a transaction metric. For example, the user interface may include one to N promotions, such as a "Zipline Tour for Two," "Gallery-Wrapped Canvas Prints," and "Roller Skating," and one or more "Remove" buttons. The transaction metrics associated to the promotions may include "$59," "$29.99," and "$11" respectively.

As shown at action 820, the server 104 may be configured to determine whether to remove the transaction metric from the consumer sharing. For example, Consumer Y may select the "Remove" button to remove one or more transaction metrics from the consumer sharing account. Upon the selection of the "Remove" button, the server 104 may remove the transaction metric from the consumer sharing account. In some embodiments, the server 104 may determine the transaction metric should be removed by evaluating click-stream data, consumer group data, and/or group reward data.

In some example embodiments, the server 104 may be configured to decrease the group progress count in response to removing a transaction metric from the consumer sharing account as shown in block 830. For example, the server 104 may receive an indication of removal of a transaction metric upon Consumer Y selecting "Remove" the promotion "Zipline Tour for Two" associated with the transaction metric "$59." In turn, the server 104 may decrease the group progress count from "$99.99" (e.g., the accumulated monetary value paid for the promotions) to "$40.99" to reflect the removal of the transaction metric from the consumer sharing account.

As shown at action 840, the server 104 may be configured to determine whether the transaction metric removed from a consumer sharing account may be re-assigned to a second consumer sharing account. The server 104 may be configured to receive an indication of re-assignment of the transaction metric. The indication may be provided to the server 104 via a user interface that includes one or more promotions associated with a consumer sharing account. The user interface may further include an "add" button to re-assign a transaction metric associated with a promotion to a second consumer sharing account.

Upon receiving an indication of re-assignment of a transaction metric, the server 104 may be configured to increase a second group progress count as shown at block 850. For example, promotion "Zipline Tour for Two" associated with transaction metric "$59" may be re-assigned to a second consumer sharing account. Upon the server 104 associating the promotion to the second consumer sharing account, a second group progress count associated with the second consumer sharing account increases according to the transaction metric, for example, the group progress count increases from "$0" to "$59."

In some embodiments, the server 104 may be configured to assign and/or remove a transaction metric associated with a promotion during a group sharing period (e.g., a predetermined period of time). For example, the server 104 may determine the group sharing period is seven days. The server 104 may be configured to assign a transaction metric to a consumer sharing account during the seven day group sharing period. However, the server 104 may be configured to decline an assignment and/or removal of a transaction metric at the expiry of the seven day group sharing period.

Example Interface for Providing Consumer Sharing Accounts

Figure 9:
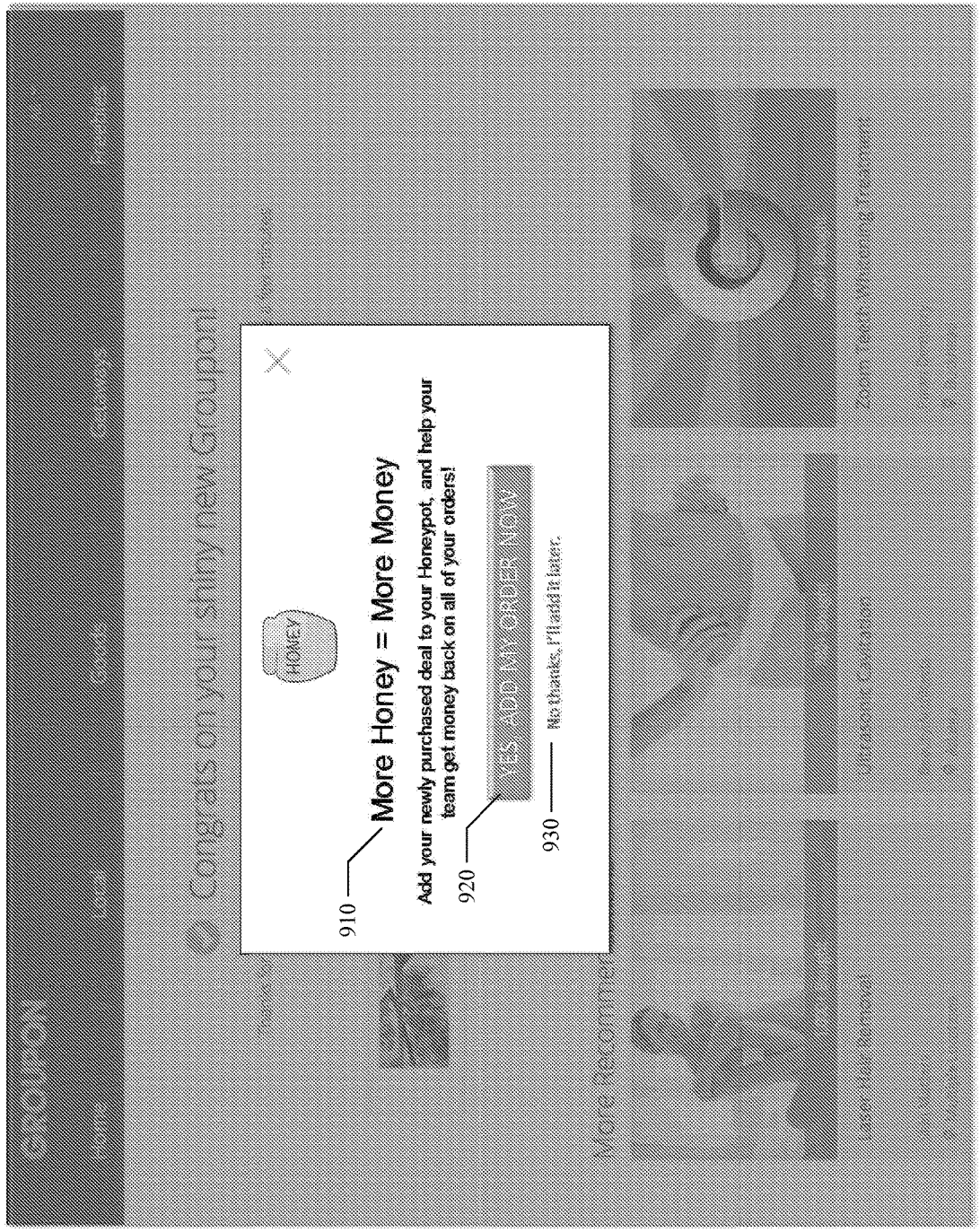
FIG. 9 illustrates an example graphical user interface for providing consumer sharing accounts that may be presented by various components of systems in accordance with some example embodiments discussed herein.

FIGS. 9 and 10 illustrate interfaces for providing consumer sharing accounts. After performing a transaction via a promotion and marketing service, a consumer may be presented with interfaces allowing the consumer to participate in a group buying experience. These interfaces may provide the consumer with the ability to assign a purchased promotion to consumer sharing account as illustrated in FIG. 9 and interact with the consumer sharing account as illustrated in FIG. 10. Such graphical user interface displays 900 and 1000 may be displayed via a consumer device 304 (e.g., a tablet, notebook, laptop, etc.) as a web page. In other embodiments, graphical user interface displays 900 and 1000 may be displayed via a consumer device 304 (e.g., a mobile device, wearable, etc.) in the form of an application interface (not shown).

FIG. 9 illustrates an example embodiment of a graphical user interface display 900 that may be used in an example embodiment to associate a transaction metric of at least one purchased promotion to a consumer sharing account, via a system 102. As can be seen in FIG. 9, the consumer sharing circuitry 212 may provide, via input/output circuitry 222, a consumer sharing account notification that includes an invitation 910 to a consumer device 304. System 100 may receive an indication of an assignment of a transaction metric to a consumer sharing account upon a consumer selecting the button 920 shown as "YES, ADD MY ORDER NOW". Alternatively, or additionally, system 100 may receive an indication of a non-assignment of a transaction metric to a consumer sharing account upon a consumer selecting the link 930 shown as "No thanks, I'll add it later."

FIG. 10 illustrates an example graphical user interface display 1000 that may be used in an example embodiment to provide, via input/output circuitry 222, a user interface for interacting with the consumer sharing account, via a system 102. As can be seen in FIG. 10, the user interface may comprise a consumer group identifier 1010 "Tho's Honeypot" and a message feed 1020 "Team Updates." Notification box 1020 may provide consumer device 304 consumer messages 1025 and/or consumer sharing account status updates. As shown in FIG. 10, example embodiments of system 102 may provide consumer sharing account instructions 1030 "New to the Honeypot? See the rules here." In other example embodiments, graphical user interface display 1000 may display a group sharing period 1040 "2 days 18:15:02." Yet, in other embodiments, a transaction metric of at least one purchased promotion may be associated to a consumer sharing account via a button 1050 "Add an Order." In some embodiments, graphical user interface display 1000 may be configured to comprise a digital progress indicator 1060 here illustrated as a honeypot including group progress thresholds.

In further embodiments, graphical user interface display 1000 may include a consumer group box 1070 "Your Team 5/8." In some embodiments, the consumer group box 1070 may comprise a consumer group creator 1075 "Tho." While in other embodiments, the consumer group box 170 may identify each consumer account, for example the consumer account 1080 "Assaf," associated with the consumer sharing account. Additionally, or alternatively, graphical user interface display 1000 may indicate the maximum number of consumer accounts that may be associated with the consumer sharing account and/or the number of available consumer accounts 1085 "+Invite" that may be associated with the consumer sharing account.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions, which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. With regard to such flowchart illustrations, while various embodiments are described as sequential steps for illustrative purposes, the inventive concepts described herein are not necessarily limited to the sequences illustrated. Indeed, various steps may be performed before or after the other as may be apparent to one of ordinary skill in the art in view of the disclosure. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising a processor and a memory, the memory comprising instructions that cause the apparatus to:
   detect, using processing circuitry, electronic marketing information corresponding to at least one user identifier of a plurality of user identifiers, the electronic marketing information comprising a plurality of data portions received via a plurality of data sources;
   identify, using the processing circuitry, a consumer sharing account associated with a first user identifier of the at least one user identifier;
   determine, using consumer sharing circuitry, a suggested user identifier set not associated with the consumer sharing account based at least in part on a determination that the suggested user identifier set is likely to associate with the consumer sharing account based at least in part on a portion of the electronic marketing information associated with the suggested user identifier set;
   detect, using e-commerce circuitry a transaction associated with the first user identifier wherein the transaction associated with the first user identifier is detected via a network interface that enables communication with a wireless communication network or a wired communication network;
   allocate, to the consumer sharing account and using the consumer sharing circuitry, at least a first portion of a dynamically-allocable transaction metric corresponding to the transaction; and
   in response to detecting the transaction associated with the first user identifier, generate, using the consumer sharing circuitry, a graphical user interface display comprising at least one group creator interface element that, upon interaction, causes sending of a consumer sharing account notification associated with the consumer sharing account to multiple user devices respectively associated with the suggested user identifier set.

2. The apparatus according to claim 1, the apparatus further caused to:
   receive a request to associate a selected user identifier of the suggested user identified set with the consumer sharing account in response to the consumer sharing account notification; and
   allocate, to the consumer sharing account, at least a first portion of a second dynamically-allocable transaction metric previously stored associated with the selected user identifier.

3. The apparatus according to claim 1, the apparatus further caused to:
   detect a second transaction associated with a selected user identifier of the suggested user identifier set; and
   allocate, to the consumer sharing account, at least a first portion of a second dynamically-allocable transaction metric associated with the transaction.

4. The apparatus according to claim 1, the apparatus further caused to:
   disassociate a selected user identifier of the suggested user identifier set from the consumer sharing account; and
   deallocate at least the first portion of the dynamically-allocable transaction metric corresponding to the transaction from the consumer sharing account.

5. The apparatus according to claim 1, the apparatus further caused to:
   determine a group progress count based on the dynamically-allocable transaction metric;
   determine the group progress count exceeds a group progress threshold;
   associate a first portion of a consumer group reward to a first user account corresponding to the first user identifier, wherein the first portion of the consumer group reward is based on a first portion of the group progress count associated with the first user identifier; and
   associate a second portion of the consumer group reward to a second user account corresponding to a second user identifier associated with the consumer sharing account, wherein the second portion of the consumer group reward is based on a second portion of the group progress count associated with the second user identifier.

6. The apparatus according to claim 1, the apparatus further caused to:
   determine at least one relevant promotion associated with the consumer sharing account based at least in part on an interest derived from at least a second portion of the electronic marketing information corresponding to each user identifier associated with the consumer sharing account; and
   transmit an impression of the at least one relevant promotion to at least the first user device,
   wherein the transaction is detected based associated with the impression of the at least one relevant promotion.

7. The apparatus according to claim 1, the apparatus further caused to determine the suggested user identifier set not associated with the consumer sharing account based at least in part on location data associated with the multiple user devices respectively associated with the suggested user identifier set.

8. A computer-implemented method comprising:
   detecting, using processing circuitry, electronic marketing information corresponding to at least one user identifier of a plurality of user identifiers, the electronic marketing information comprising a plurality of data portions received via a plurality of data sources;
   identifying, using the processing circuitry, a consumer sharing account associated with a first user identifier of the at least one user identifier;
   determining, using consumer sharing circuitry, a suggested user identifier set not associated with the consumer sharing account based at least in part on a determination that the suggested user identifier set is likely to associate with the consumer sharing account based at least in part on a portion of the electronic marketing information associated with the suggested user identifier set;

detecting, using e commerce circuitry, a transaction associated with the first user identifier, wherein the transaction associated with the first user identifier is detected via a network interface that enables communication with a wireless communication network or a wired communication network;

allocating, to the consumer sharing account and using the consumer sharing circuitry, at least a first portion of a dynamically-allocable transaction metric corresponding to the transaction; and in response to detecting the transaction associated with the first user identifier, generating, using the consumer sharing circuitry, a graphical user interface display comprising at least one group creator interface element that, upon interaction, causes sending of a consumer sharing account notification associated with the consumer sharing account to multiple user devices respectively associated with the suggested user identifier set.

9. The computer-implemented method according to claim 8, the computer-implemented method further comprising:
receiving a request to associate a selected user identifier of the suggested user identifier set with the consumer sharing account in response to the consumer sharing account notification; and
allocating, to the consumer sharing account, at least a first portion of a second dynamically-allocable transaction metric previously stored associated with the selected user identifier.

10. The computer-implemented method according to claim 8, the computer-implemented method further comprising:
detecting a second transaction associated with a selected user identifier of the suggested user identifier set; and
allocating, to the consumer sharing account, at least a first portion of a second dynamically-allocable transaction metric associated with the transaction.

11. The computer-implemented method according to claim 8, the computer-implemented method further comprising:
disassociating a selected user identifier of the suggested user identifier set from the consumer sharing account; and
deallocating at least the first portion of the dynamically-allocable transaction metric corresponding to the transaction from the consumer sharing account.

12. The computer-implemented method according to claim 8, the computer-implemented method further comprising:
determining a group progress count based on the dynamically-allocable transaction metric;
determining the group progress count exceeds a group progress threshold;
associating a first portion of a consumer group reward to a first user account corresponding to the first user identifier, wherein the first portion of the consumer group reward is based on a first portion of the group progress count associated with the first user identifier; and
associating a second portion of the consumer group reward to a second user account corresponding to a second user identifier associated with the consumer sharing account, wherein the second portion of the consumer group reward is based on a second portion of the group progress count associated with the second user identifier.

13. A computer program product comprising at least one non-transitory computer-readable storage medium having computer program code stored thereon that, in execution with at least one processor, configures the computer program product for:
detecting, using processing circuitry, electronic marketing information corresponding to at least one user identifier of a plurality of user identifiers, the electronic marketing information comprising a plurality of data portions received via a plurality of data sources;
identifying, using the processing circuitry, a consumer sharing account associated with a first user identifier of the at least one user identifier,
determining, using consumer sharing circuitry, a suggested user identifier set not associated with the consumer sharing account based at least in part on a determination that the suggested user identifier set is likely to associate with the consumer sharing account based at least in part on a portion of the electronic marketing information associated with the suggested user identifier set;
detecting, using e-commerce circuitry, a transaction associated with the first user identifier, wherein the transaction associated with the first user identifier is detected via a network interface that enables communication with a wireless communication network or a wired communication network;
allocating, to the consumer sharing account and using the consumer sharing circuitry, at least a first portion of a dynamically-allocable transaction metric corresponding to the transaction; and
in response to detecting the transaction associated with the first user identifier, generating, using the consumer sharing circuitry, a graphical user interface display comprising at least one group creator interface element that, upon interaction, causes sending of a consumer sharing account notification associated with the consumer sharing account to a multiple user devices respectively associated with the suggested user identifier set.

14. The apparatus according to claim 7, the apparatus further caused to:
receive the location data via multiple location services circuitries, wherein each of the multiple location services circuitries is associated with one of the multiple user devices.

15. The apparatus according to claim 1, the apparatus further caused to:
determine at least one relevant promotion associated with the consumer sharing account based at least in part on a determination that a device associated with the consumer sharing account is within a proximity of a detected location of the device.

16. The apparatus according to claim 1, wherein the graphical user interface display further comprises a group progress interface element positioned proximate the at least one group creator interface element.

17. The apparatus according to claim 16, the apparatus further caused to:
determine a group progress count based on the dynamically-allocable transaction metric;
determine the group progress count exceeds a group progress threshold; and
in response to the determination that the group progress count exceeds a group progress threshold, causing the group progress interface element to be updated.

18. The apparatus according to claim 14, wherein the location data is received from at least one of a global positioning service receiver, an indoor navigation system, a cellular tower triangulation technique system, a video surveillance system, or a radio frequency identification location system.

19. The apparatus according to claim 16, wherein the graphical user interface display further comprises a group sharing period interface element positioned proximate the at least one group creator interface element, wherein the group sharing period interface element comprises a live time indication associated with a group sharing period.

20. The apparatus according to claim 1, wherein the processing circuitry comprises processing circuitry hardware, wherein the consumer sharing circuitry comprises consumer sharing circuitry hardware, wherein the e-commerce circuitry comprises e-commerce circuitry hardware.

\* \* \* \* \*

UNITED STATES PATENT AND TRADEMARK OFFICE
CERTIFICATE OF CORRECTION

PATENT NO. : 12,198,171 B2  
APPLICATION NO. : 17/659952  
DATED : January 14, 2025  
INVENTOR(S) : Thothathri Srinivasan et al.

Page 1 of 1

It is certified that error appears in the above-identified patent and that said Letters Patent is hereby corrected as shown below:

In the Claims

In Column 41, Line 40, Claim 1, delete "circuitry" and insert -- circuitry, --, therefor.

In Column 41, Line 41, Claim 1, delete "identifier" and insert -- identifier, --, therefor.

In Column 43, Line 1, Claim 8, delete "e commerce" and insert -- e-commerce --, therefor.

Signed and Sealed this  
Twelfth Day of August, 2025

Coke Morgan Stewart  
*Acting Director of the United States Patent and Trademark Office*